(12) United States Patent
Takeda et al.

(10) Patent No.: US 9,334,134 B2
(45) Date of Patent: May 10, 2016

(54) IMAGE READING APPARATUS, DOCUMENT CONVEYING APPARATUS AND COMPOSITE APPARATUS

(71) Applicant: Oki Data Corporation, Tokyo (JP)

(72) Inventors: Taishi Takeda, Tokyo (JP); Takashi Saitou, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 14/633,132

(22) Filed: Feb. 26, 2015

(65) Prior Publication Data

US 2015/0239694 A1  Aug. 27, 2015

(30) Foreign Application Priority Data

Feb. 27, 2014  (JP) ................................. 2014-037123

(51) Int. Cl.
*B65H 7/02* (2006.01)
*H04N 1/00* (2006.01)
*B65H 7/06* (2006.01)
*B65H 7/20* (2006.01)

(52) U.S. Cl.
CPC .. *B65H 7/06* (2013.01); *B65H 7/02* (2013.01); *B65H 7/20* (2013.01); *H04N 1/00588* (2013.01); *H04N 1/00599* (2013.01); *H04N 1/00652* (2013.01); *H04N 1/00657* (2013.01); *H04N 1/00689* (2013.01); *H04N 1/00745* (2013.01); *H04N 1/00779* (2013.01); *H04N 1/00798* (2013.01)

(58) Field of Classification Search
CPC .............. B65H 7/02; B65H 7/18; B65H 7/06; B65H 2511/514; B65H 2701/1313; B65H 3/0699; H04N 1/0057; H04N 1/00588; H04N 1/00591; H04N 1/00745
See application file for complete search history.

(56) References Cited

U.S. PATENT DOCUMENTS 6,285,853 B1 * 9/2001 Sano ...................... G03G 15/60
358/496

FOREIGN PATENT DOCUMENTS

JP        60023238 A  *  2/1985
JP       H10-145552 A      5/1998

* cited by examiner

*Primary Examiner* — Luis A Gonzalez
(74) *Attorney, Agent, or Firm* — Rabin & Berdo, P.C.

(57) ABSTRACT

An image reading apparatus includes a feeding mechanism that individually feeds documents, a conveying mechanism that conveys the document fed by the feeding mechanism so that the document passes a reading position, a reading unit that reads the document at the reading position, and a control unit that controls the feeding mechanism and the conveying mechanism. When the control unit causes the feeding mechanism and the conveying mechanism to feed and convey a plurality of documents at constant intervals, the control unit causes the feeding mechanism to stop feeding after a trailing edge of a preceding document passes the reading position.

17 Claims, 26 Drawing Sheets

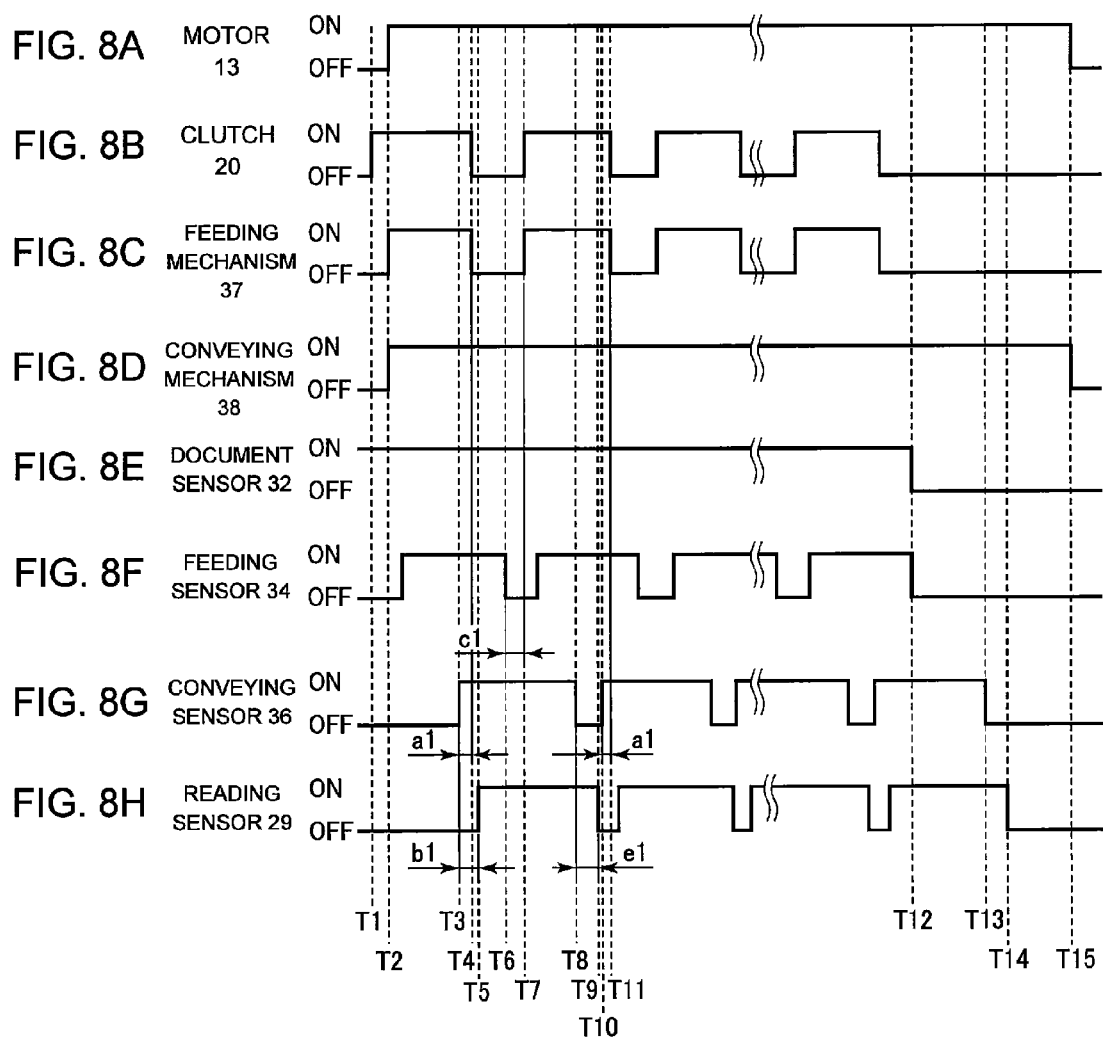

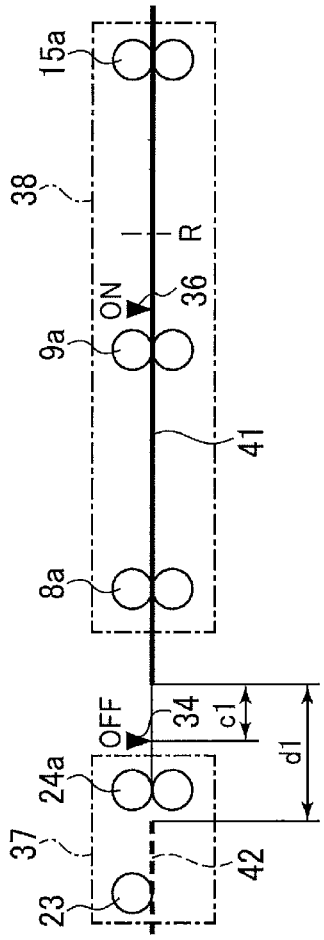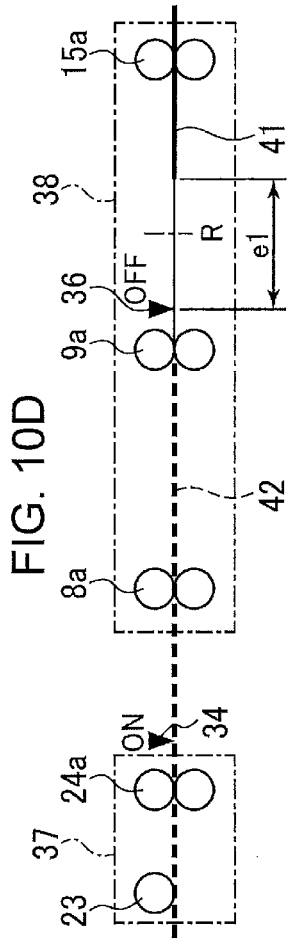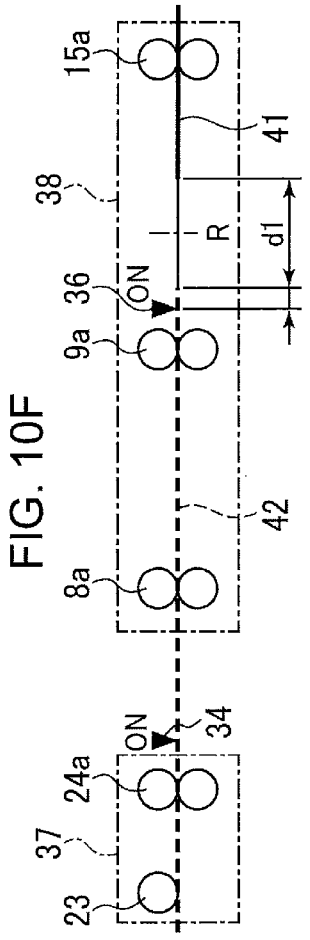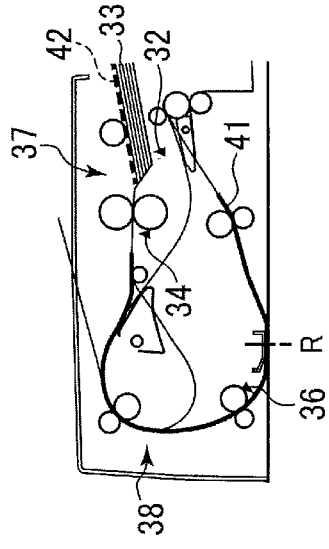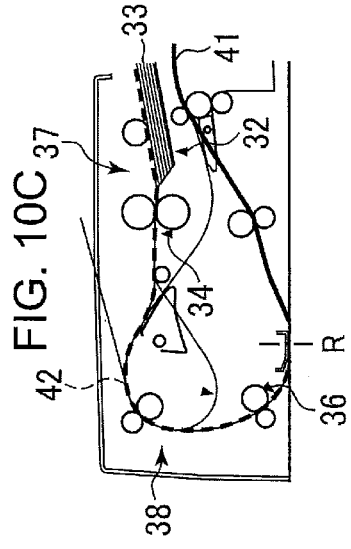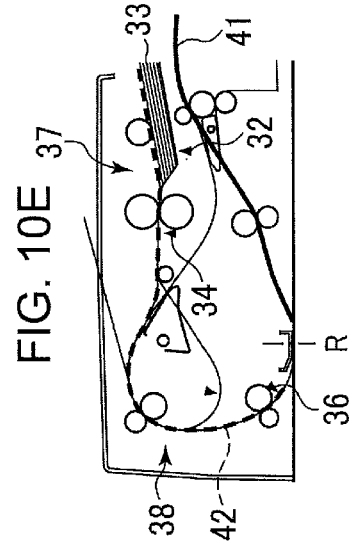

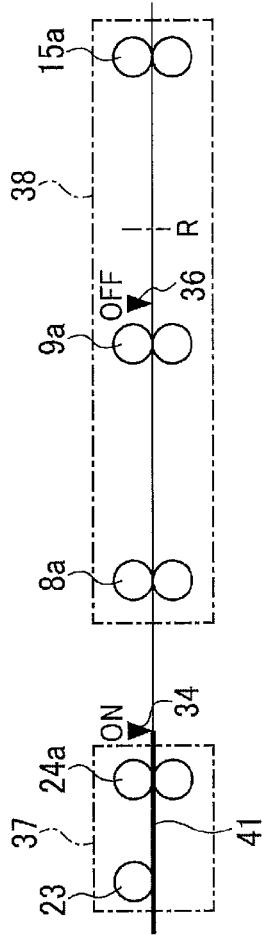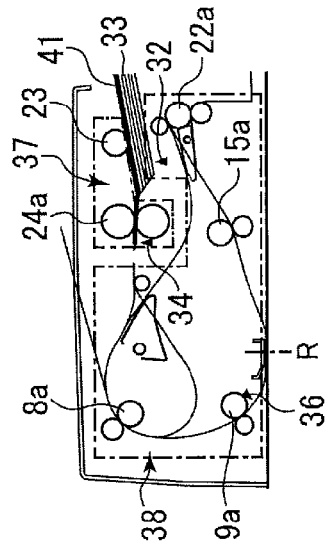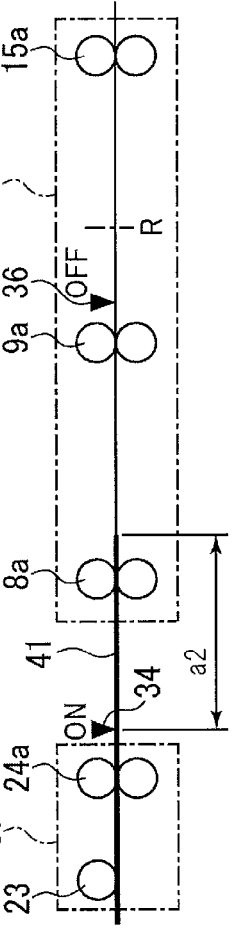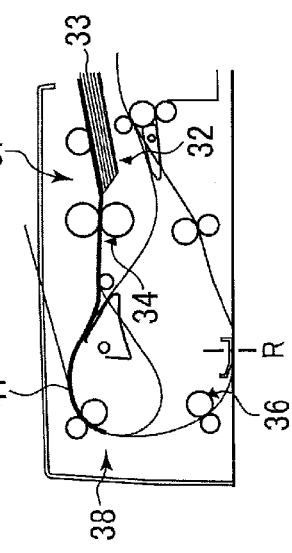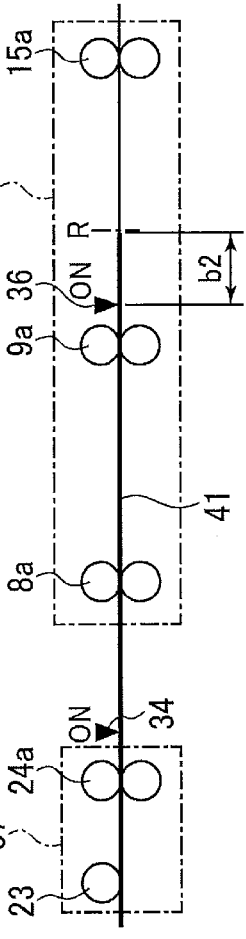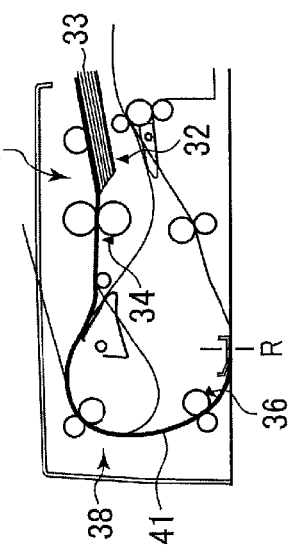

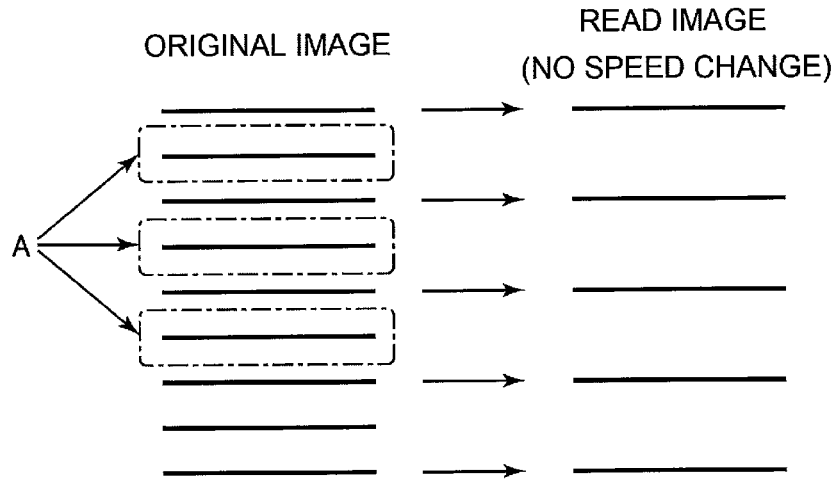
FIG. 14A ORIGINAL IMAGE
FIG. 14B READ IMAGE (NO SPEED CHANGE)
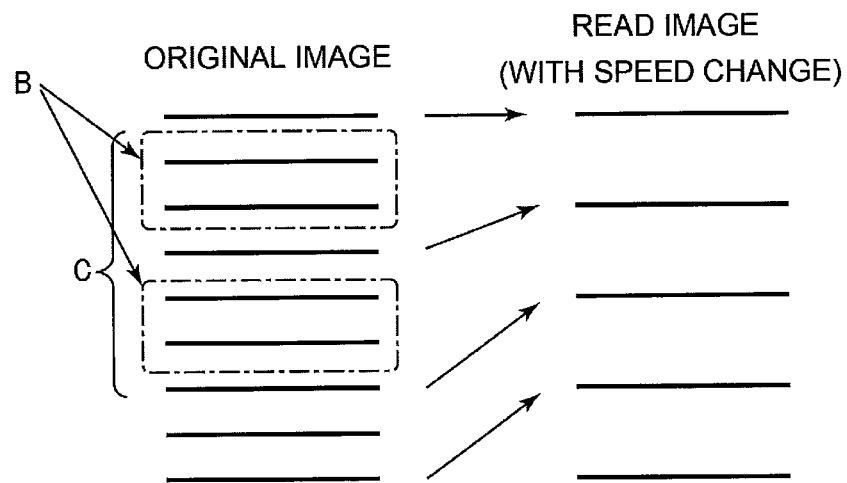
FIG. 14C ORIGINAL IMAGE
FIG. 14D READ IMAGE (WITH SPEED CHANGE)

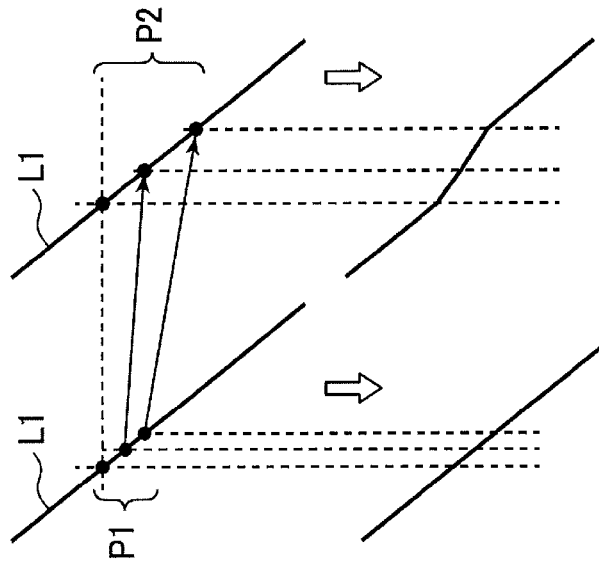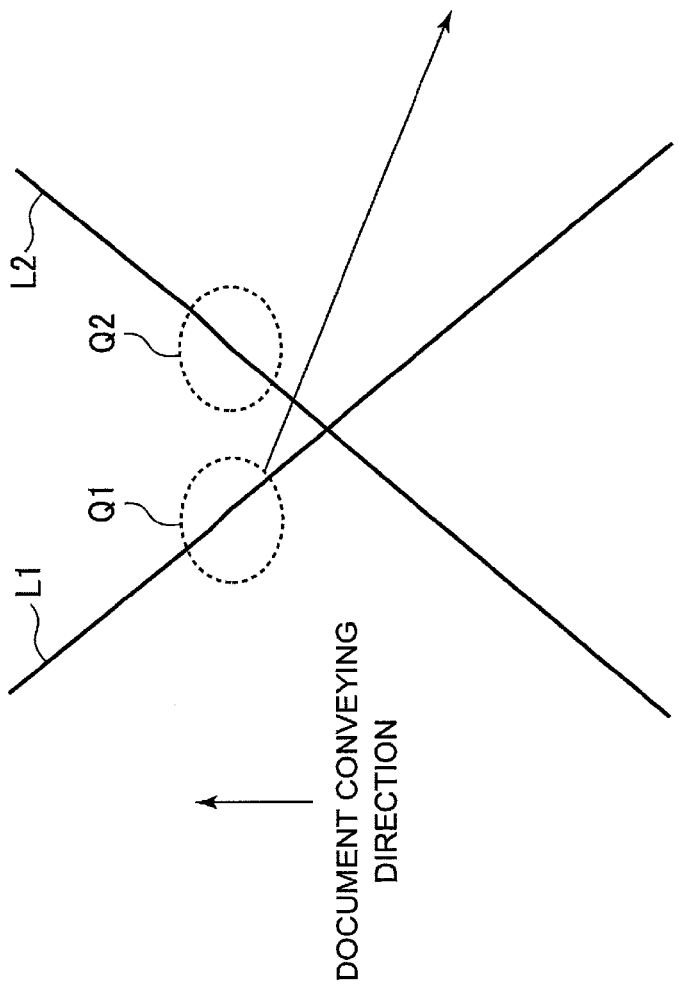

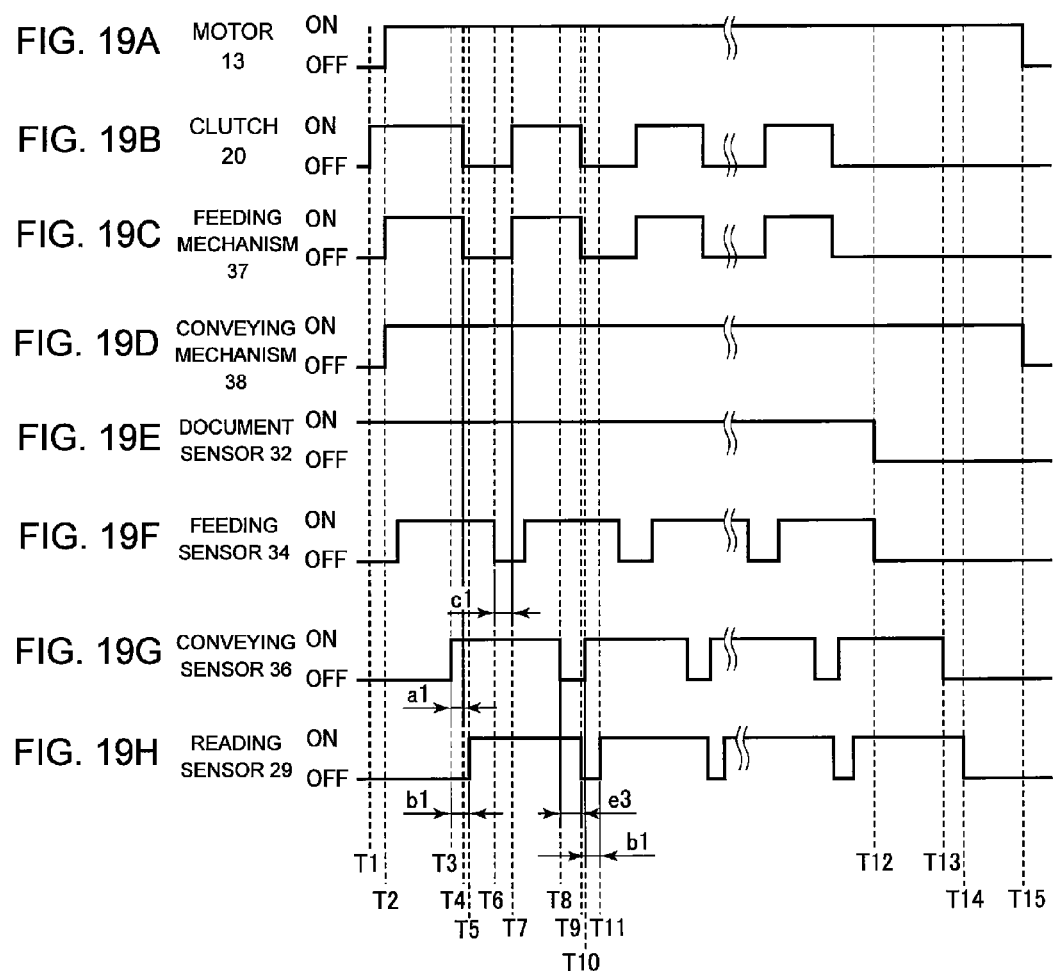

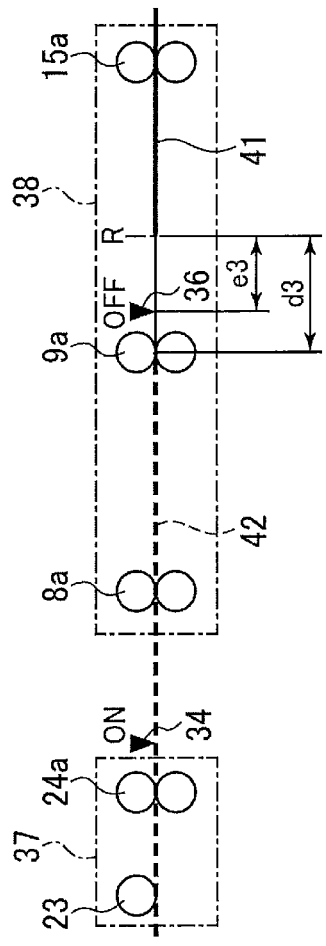
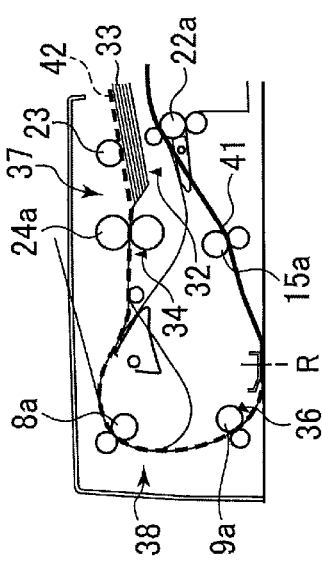
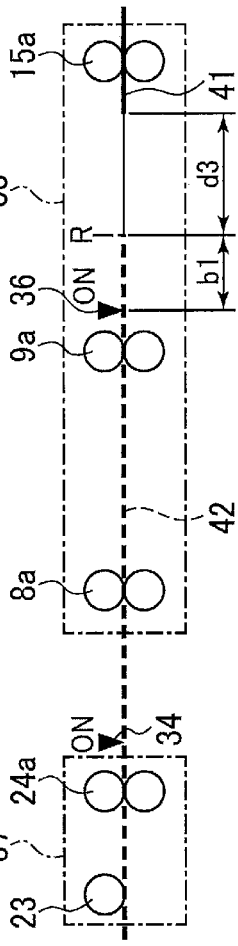
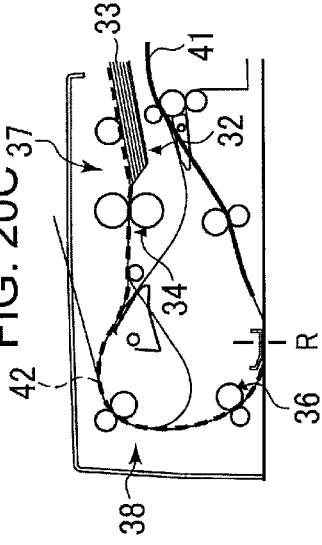

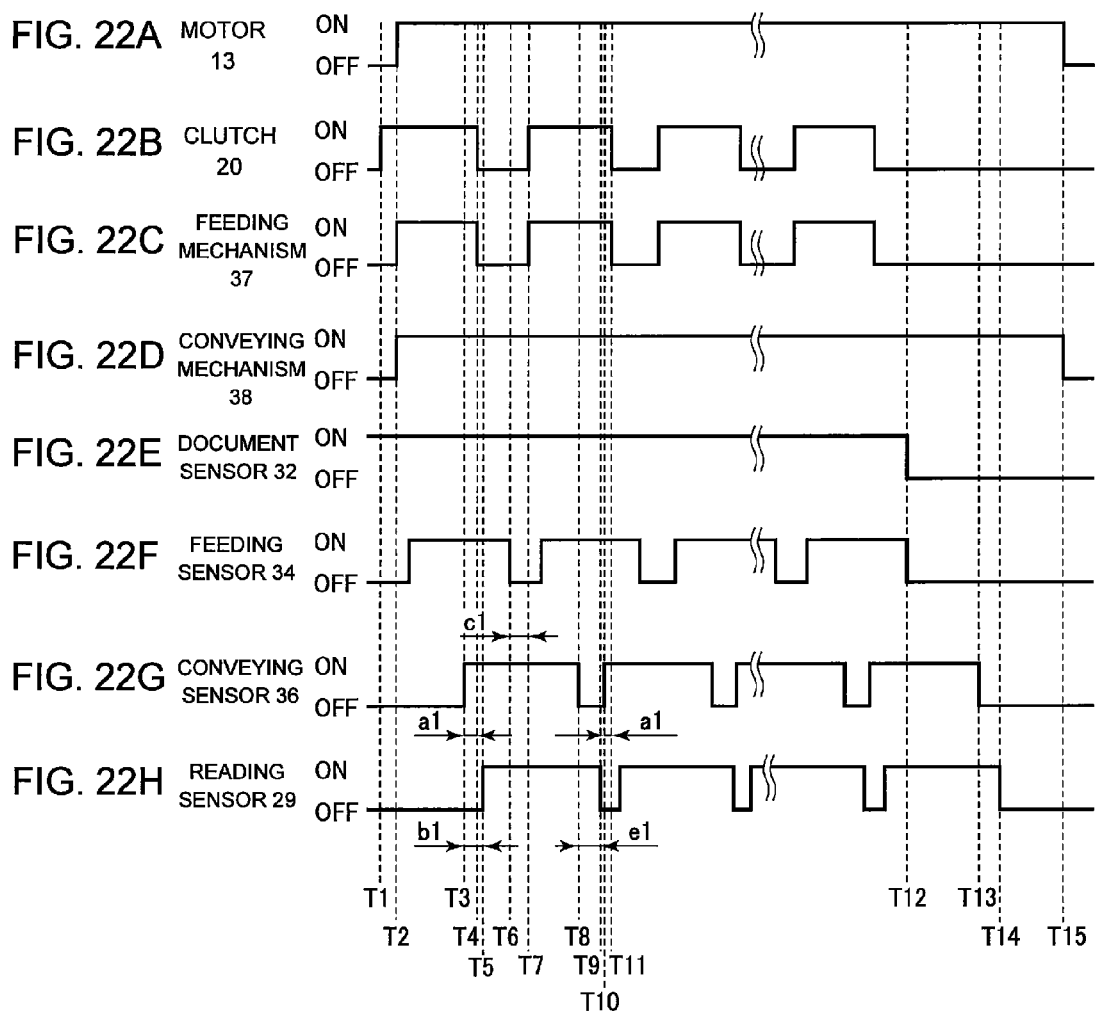

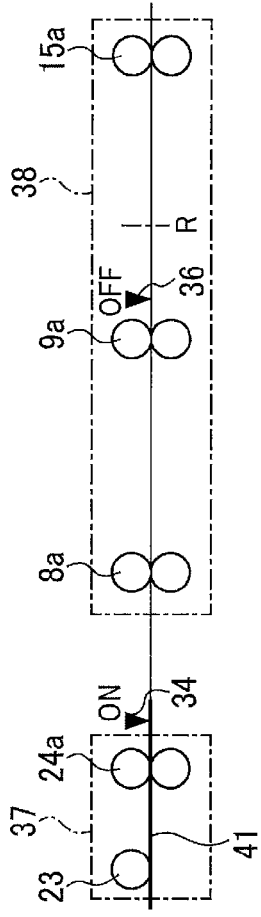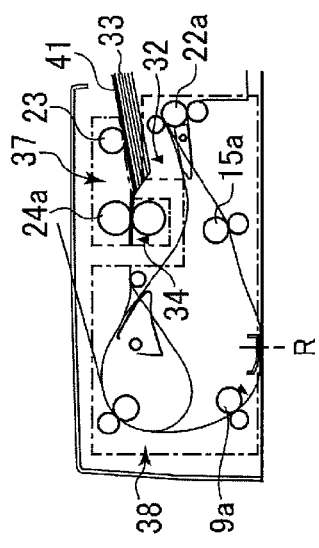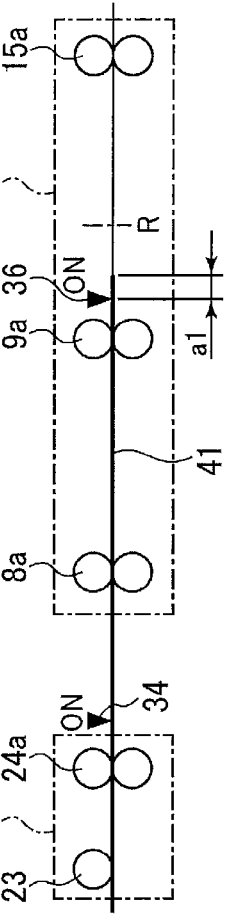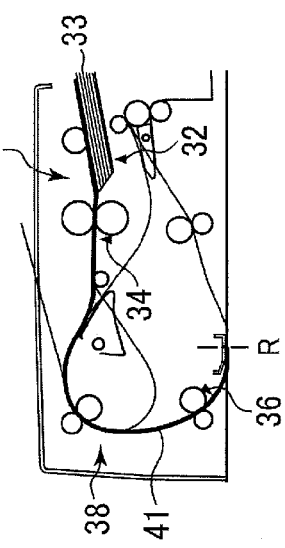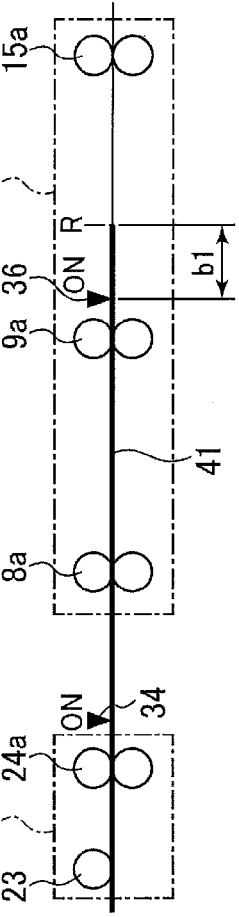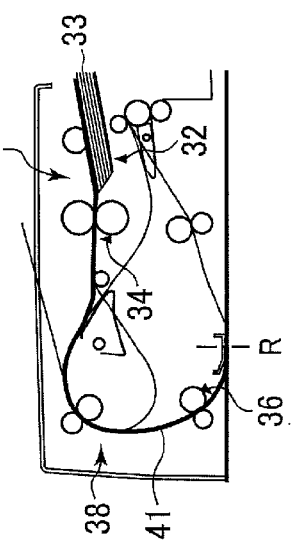

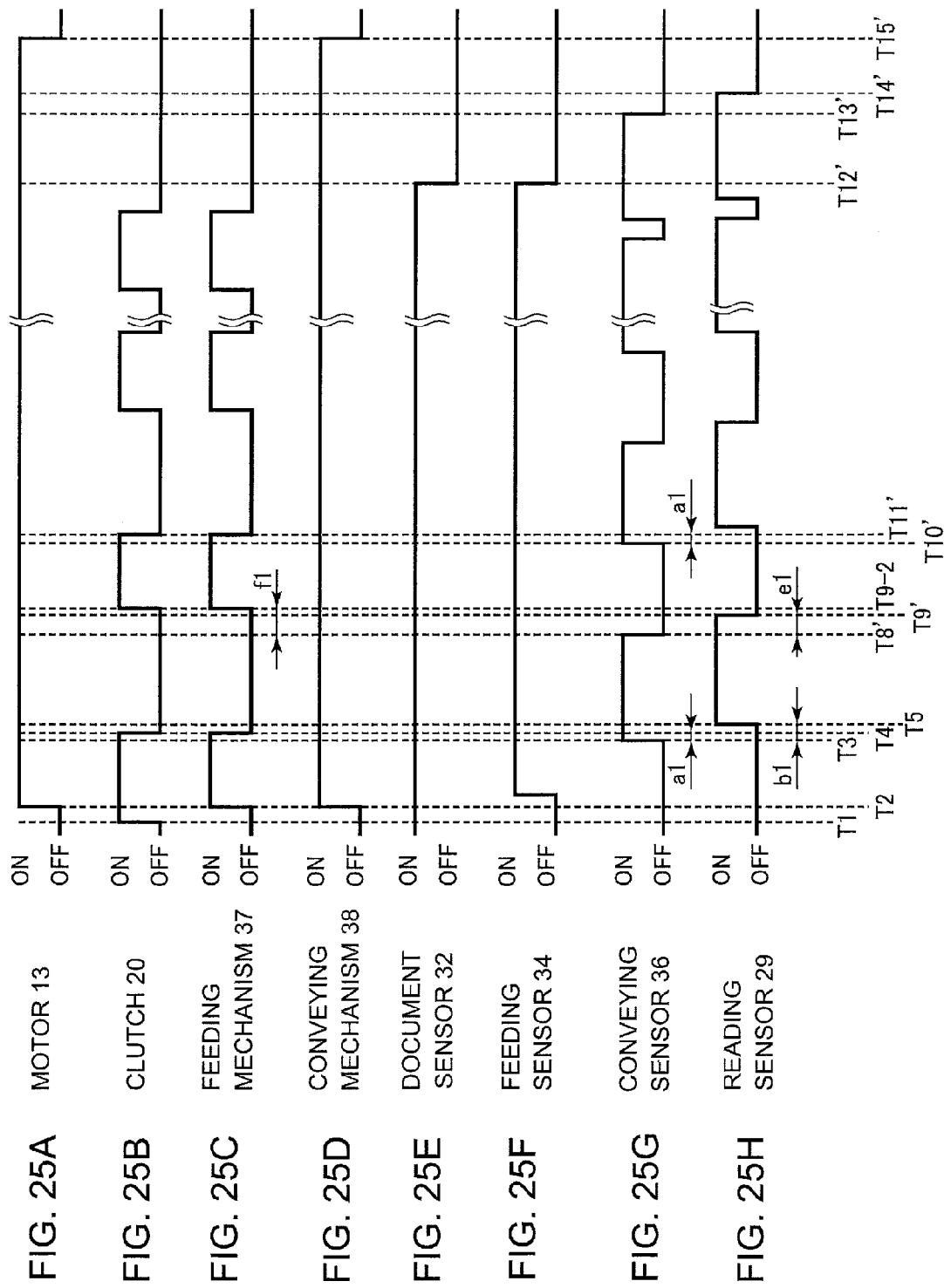

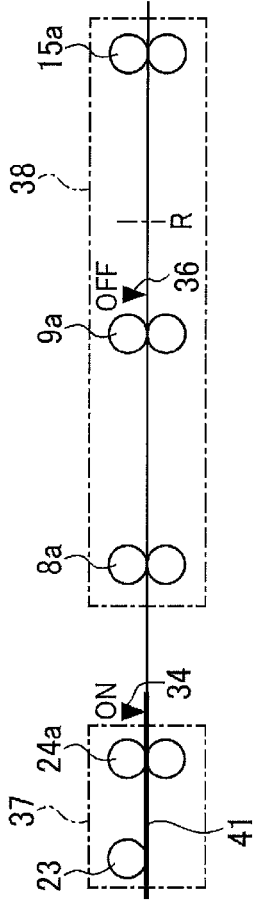
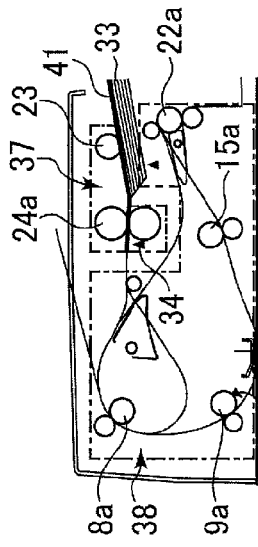
FIG. 26B
FIG. 26A
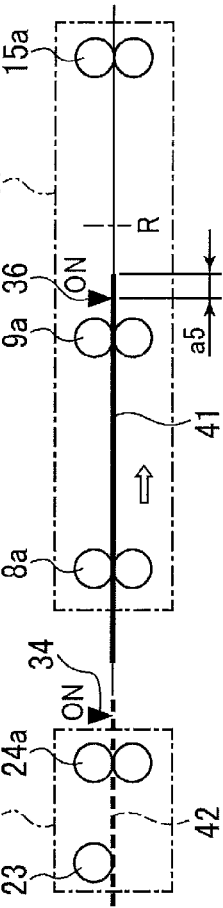
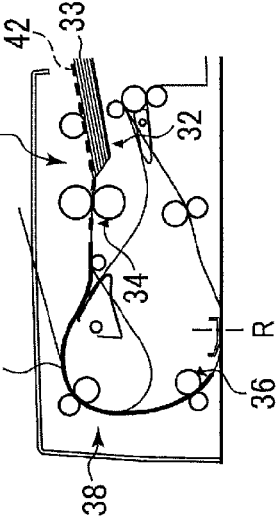
FIG. 26D
FIG. 26C
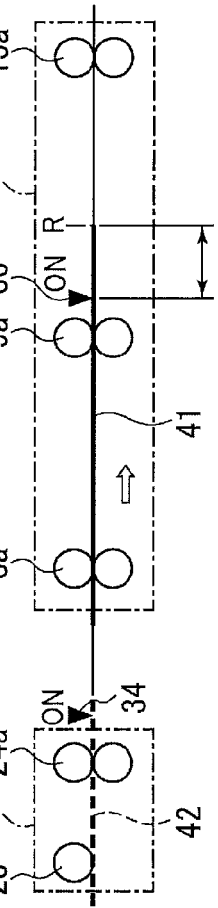
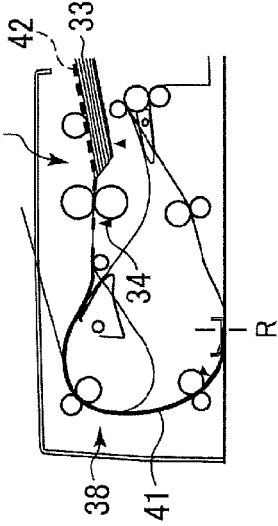
FIG. 26F
FIG. 26E

IMAGE READING APPARATUS, DOCUMENT CONVEYING APPARATUS AND COMPOSITE APPARATUS

BACKGROUND OF THE INVENTION

The present invention relates to an image reading apparatus, a document conveying apparatus and a composite apparatus.

In an image reading apparatus, if a rotation speed of a conveying roller for conveying a document changes, a conveying speed of the document which is being read may also change. This may result in occurrence of distortion in a read image.

Therefore, Japanese Application Publication No. H10-145552 discloses an image reading apparatus that detects a conveying speed of a document, creates distortion correction data based on a change rate of the detected conveying speed, and corrects a read image using the distortion correction data.

However, in general, an image is read at constant intervals, i.e., a predetermined number of lines are thinned out. Therefore, if the conveying speed of the document changes during the reading of the document, the number of lines which are thinned out may increase or decrease. Therefore, even if the correction of the read image is performed as described above, a read image may be different from an original image.

Therefore, there is a demand for technology capable of preventing occurrence of distortion in a read image due to a change in a conveying speed of a document.

SUMMARY OF THE INVENTION

An aspect of the present invention is intended to prevent occurrence of distortion in a read image caused by a change in a conveying speed of a document.

According to an aspect of the present invention, there is provided an image reading apparatus including a feeding mechanism that individually feeds documents, a conveying mechanism that conveys the document fed by the feeding mechanism so that the document passes a reading position, a reading unit that reads the document at the reading position, and a control unit that controls the feeding mechanism and the conveying mechanism. When the control unit causes the feeding mechanism and the conveying mechanism to feed and convey a plurality of documents at constant intervals, the control unit causes the feeding mechanism to stop feeding after a trailing edge of a preceding document passes the reading position.

Since the feeding mechanism stops feeding after a trailing edge of a preceding document passes the reading position, a change in the conveying speed of the document is prevented while the document is being read. Therefore, occurrence of distortion in a read image can be suppressed.

According to another aspect of the present invention, there is provided a composite apparatus including the image reading apparatus, and an image forming apparatus that forms an image on a medium.

According to still another aspect of the present invention, there is provided a document conveying apparatus including a feeding mechanism that individually feeds documents, a conveying mechanism that conveys the document fed by the feeding mechanism so that the document passes a reading position, and a control unit that controls the feeding mechanism and the conveying mechanism. When the control unit causes the feeding mechanism and the conveying mechanism to feed and convey a plurality of documents at constant intervals, the control unit causes the feeding mechanism to stop feeding after a trailing edge of a preceding document passes the reading position.

Further scope of applicability of the present invention will become apparent from the detailed description given hereinafter. However, it should be understood that the detailed description and specific embodiments, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIGS. 8A through 8H are timing charts showing the operation of the scanner unit according to the first embodiment;

FIGS. 10A through 10F are schematic views showing conveying states and conveying positions of the document according to the first embodiment;

FIGS. 12A through 12F are schematic views showing conveying states and conveying positions of the document according to Comparison Example;

FIGS. 14A through 14D are schematic views for illustrating distortion in a read image due to a change in a conveying speed;

FIGS. 15A through 15E are schematic views for illustrating the distortion in the read image due to the change in the conveying speed;

FIGS. 19A through 19H are timing charts showing the operation of the scanner unit according to the second embodiment;

FIGS. 20A through 20D are schematic views showing conveying states and conveying positions of a document according to the second embodiment;

FIGS. 22A through 22H are timing charts showing the operation of the scanner unit according to the third embodiment in the case where a document size is B5 or larger;

FIGS. 23A through 23F are schematic views showing conveying states and conveying positions of the document according to the third embodiment in the case where the document size is B5 or larger;

FIGS. 25A through 25H are timing charts showing the operation of the scanner unit according to the third embodiment in the case where the document size is A5 or smaller;

FIGS. 26A through 26F are schematic views showing conveying states and conveying positions of the document according to the third embodiment in the case where the document size is A5 or smaller;

DETAILED DESCRIPTION OF THE PREFERRED EMBODIMENT

First Embodiment

The first embodiment of the present invention will be described.

Figure 1:
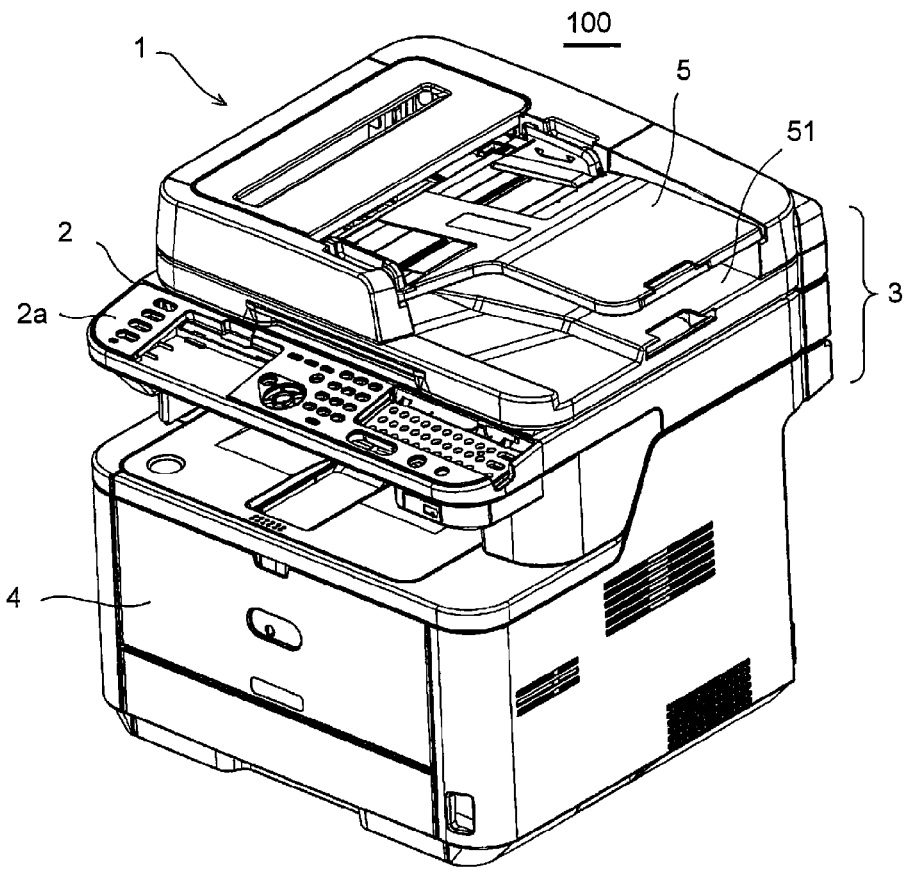
FIG. 1 is a perspective view showing an MFP according to the first embodiment of the present invention.

FIG. 1 is a perspective view showing an MFP (Multi-Function Peripheral) 100 as a composite apparatus according to the first embodiment. As shown in FIG. 1, the MFP 100 as a composite apparatus includes a scanner unit 3 as an image reading apparatus, and a printer unit 4 as an image forming apparatus. The scanner unit 3 is provided above the printer unit 4. The scanner unit 3 is connected to the printer unit 4 via a hinge mechanism so that the scanner unit 3 is openable and closable with respect to the printer unit 4.

Figure 2:
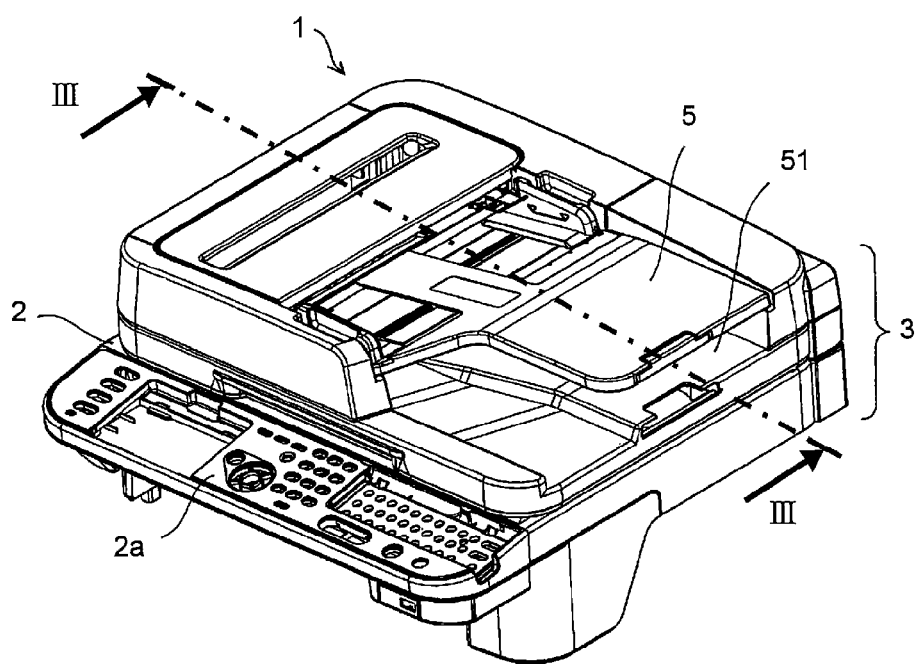
FIG. 2 is a perspective view showing a scanner unit according to the first embodiment.

FIG. 2 is a perspective view showing the scanner unit 3. The scanner unit 3 includes a flatbed 2 as a base, a document table 5 as a document setting portion, and an ADF (Automatic Document Feeder) 1 as a document conveying apparatus. Documents (also referred to as manuscripts) to be read are set on the document table 5. The ADF 1 individually conveys documents from the document table 5. The ADF 1 is connected to the flatbed 2 via a hinge mechanism so that the ADF 1 is openable and closable with respect to the flatbed 2.

The scanner unit 3 reads an image of the document, and outputs read image data to a personal computer connected to the MFP 100, or outputs the read image data to the printer unit 4 so that the printer unit 4 prints the image data.

Figure 3:
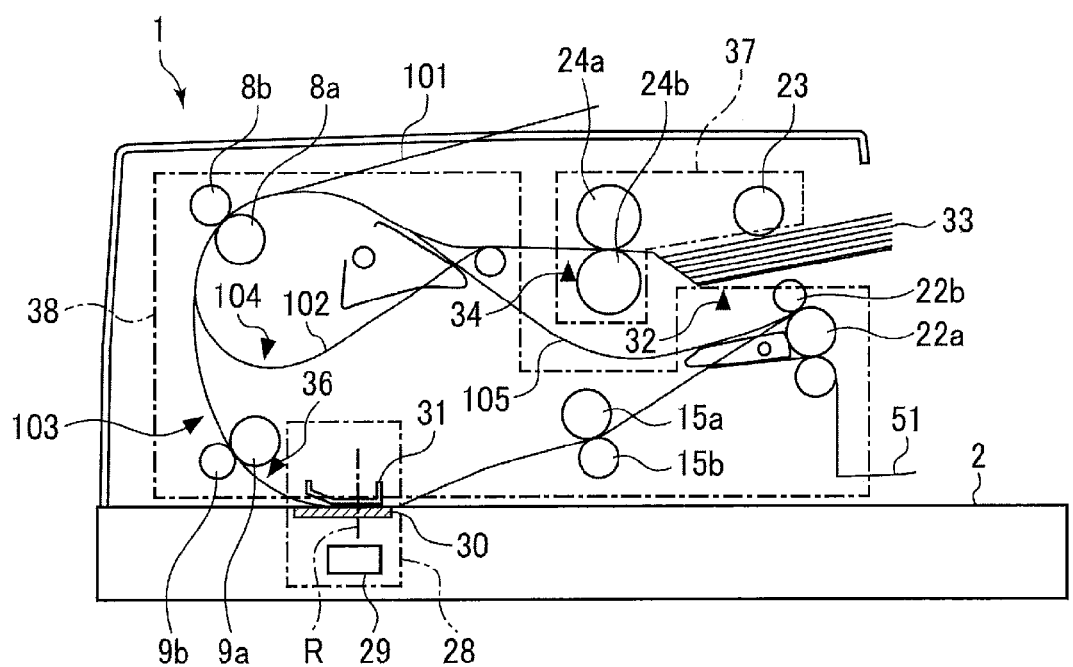
FIG. 3 is a sectional view showing the scanner unit according to the first embodiment.

FIG. 3 is a sectional view of the scanner unit 3 taken along line III-III shown in FIG. 2. The ADF 1 is provided above the flatbed 2. An image reading unit 28 (FIG. 3) is provided on the flatbed 2. The image reading unit 28 reads an image of the document conveyed by the ADF 1.

The image reading unit 28 includes a reading sensor 29, a light transmitting plate 30, and a document holder 31. The reading sensor 29 (i.e., a reading unit) is a line sensor including a plurality of reading elements arranged in a main scanning direction. The reading sensor 29 is positioned at a predetermined reading position R (i.e., a document reading position), and reads an image of the document which is conveyed in a sub-scanning direction perpendicular to the main scanning direction on the light transmitting plate 30.

The light transmitting plate 30 is formed of a material that transmits light emitted by the reading sensor 29 when reading the document. The document holder 31 is provided above the light transmitting plate 30 so as to face the light transmitting plate 30. The document holder 31 holds the document against a surface of the light transmitting plate 30 so that the document does not move upward away from the surface of the light transmitting plate 30.

In a certain operation mode of the scanner unit 3, a user may open the ADF 1 (i.e., swing the ADF 1 upward), and place a document on an upper surface of the flatbed 2. In this operation mode, the ADF 1 is not operated. Instead, the reading sensor 29 moves in the sub-scanning direction (i.e., a left-right direction in FIG. 3) to read the document placed on the flatbed 2. Detailed description of this mode will be omitted.

The ADF 1 includes a pickup roller 23, a feeding roller 24a, a first conveying roller 8a, a second conveying roller 9a, a first ejection roller 15a and a second ejection roller 22a which are arranged along a conveying path of the document from the document table 5.

The ADF 1 further includes pinch rollers 24b, 8b, 9b, 15b and 22b (i.e., driven rollers) which are respectively paired with the feeding roller 24a, the first conveying roller 8a, the second conveying roller 9a, the first ejection roller 15a and the second ejection roller 22a.

Respective rollers of the ADF 1 (i.e., the pickup roller 23, the feeding roller 24a, the first conveying roller 8a, the second conveying roller 9a, the first ejection roller 15a, the second ejection roller 22a, and the pinch rollers 24b, 8b, 9b, 15b and 22b) are supported by a frame of the ADF 1, and are rotatable about rotation axes parallel to the main scanning direction.

The pickup roller 23 is provided so as to contact a surface of an uppermost document of the documents set on the document table 5 (FIGS. 1 and 2). The document table 5 is omitted in FIG. 3. However, a setting position of the documents on the document table 5 is shown as a document setting position 33 in FIG. 3. The pickup roller 23 rotates clockwise in FIG. 3, and individually feeds the documents set on the table 5 starting from the uppermost document. The feeding roller 24a further feeds the document fed by the pickup roller 23.

The first conveying roller 8a and the second conveying roller 9a convey the document (fed by the pickup roller 23 and the feeding roller 24a) toward the reading position R. The second conveying roller 9a is disposed upstream of and adjacent to the image reading unit 28 in a conveying direction of the document (i.e., a document conveying direction).

The first ejection roller 15a conveys the document having passed through the reading position R toward the second ejection roller 22a. The second ejection roller 22a ejects the document having been conveyed by the first ejection roller 15a from the ADF 1. A stacker portion for receiving the ejected document is provided below the document table 5.

A document sensor 32 is provided in the vicinity of the document setting position 33. The document sensor 32 detects presence or absence of the document in the document setting position 33 (i.e., whether there is any document on the document table 5). A feeding sensor 34 (i.e., a feeding detection unit) for detecting a passage of the document is provided downstream of the feeding roller 24 in the document conveying direction. A distance (interval) between a preceding document and a subsequent document is adjusted based on a detection signal of the feeding sensor 34.

A conveying sensor 36 (i.e., a conveyance detection unit or a first conveyance detection unit) for detecting a passage of the document is provided downstream of the second conveying roller 9a in the document conveying direction. A reading of the document by the reading sensor 29 at the reading position R is started based on a detection signal of the conveying sensor 36.

The pickup roller 23 and the feeding roller 24a constitute a feeding mechanism 37 (FIG. 3) that individually feeds the documents. The first conveying roller 8a, the second conveying roller 9a, the first ejection roller 15a and the second ejection roller 22a constitute a conveying mechanism 38 (FIG. 3) that conveys the document fed by the feeding mechanism 37.

As shown in FIG. 3, the ADF 1 includes inverting paths 101, 102 and 105 used for inverting the document in a double-side reading mode. The ADF 1 further includes a sensor 103 used in an operation to align a leading edge of the document (i.e., to correct a skew of the document) by causing the leading edge to be pressed against the second conveying roller 9a. The ADF 1 further includes a sensor 104 used to detect a position of the document in the double-side reading mode. Detailed descriptions of these elements will be omitted.

Figure 4:
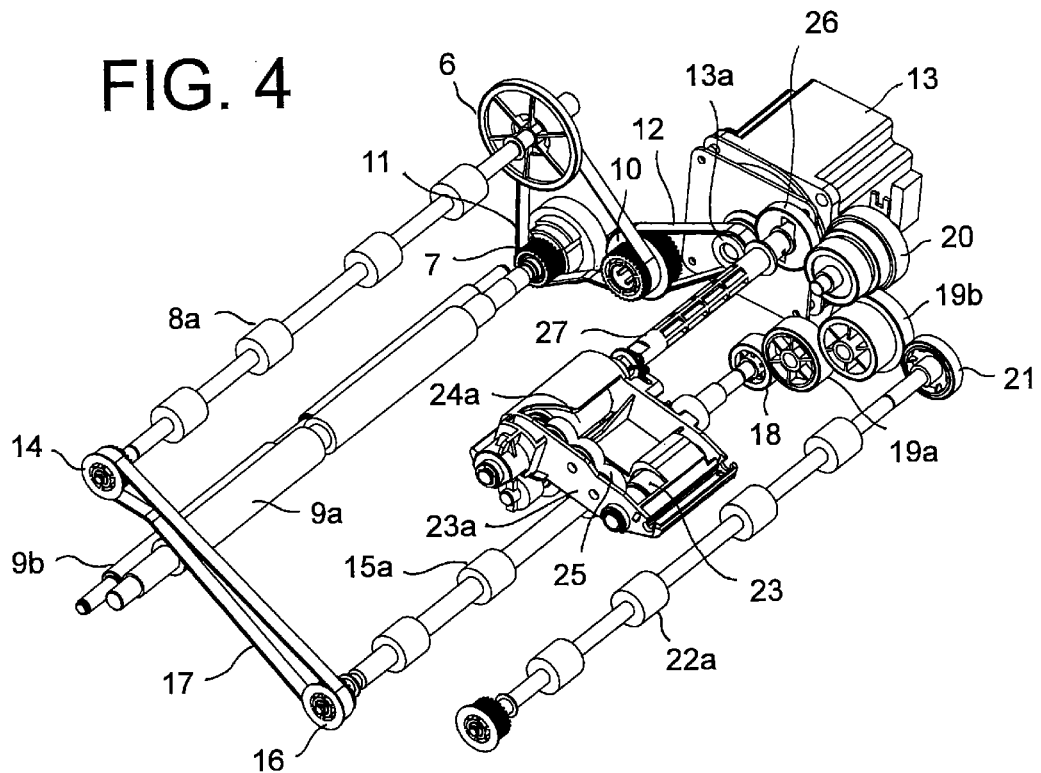
FIG. 4 is a perspective view showing respective rollers of an ADF and a driving mechanism according to the first embodiment.
Figure 5:
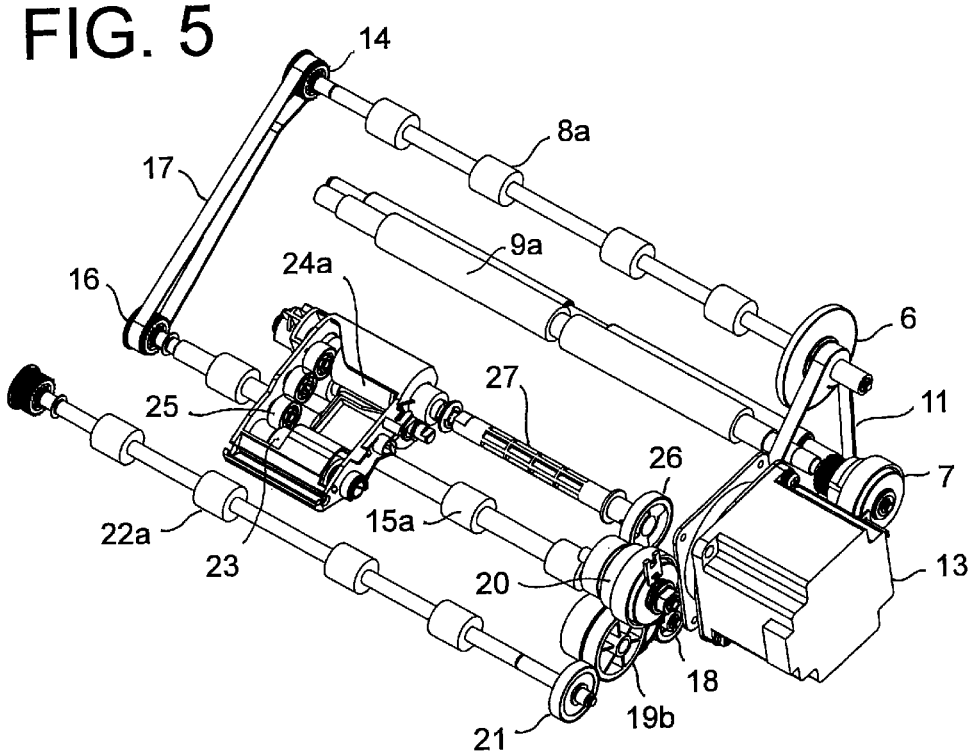
FIG. 5 is a perspective view showing respective rollers of the ADF and the driving mechanism according to the first embodiment.

FIG. 4 is a perspective view showing the pickup roller 23, the feeding roller 24a, the first conveying roller 8a, the second conveying roller 9a, the first ejection roller 15a, the second ejection roller 22a of the ADF 1 and a driving mechanism for these rollers. FIG. 5 is a perspective view showing the respective rollers and the driving mechanism shown in FIG. 4 as seen in a different direction. In this regard, the pinch rollers 24b, 8b, 9b, 15b and 22b are omitted in FIGS. 4 and 5.

The respective rollers of the ADF 1 are driven by a motor 13 as a common driving source. A timing belt 12 having an endless shape is wound on an output shaft 13a of the motor 13. The timing belt 12 is also wound on a pulley 10. The pulley 10 includes a larger diameter part and a smaller diameter part which are coaxially combined. The timing belt 12 is wound on the larger diameter part of the pulley 10. A timing belt 11 having an endless shape is wound on the smaller diameter part of the pulley 10.

The timing belt 11 is wound on the above described pulley 10, a pulley 7 mounted to an end of a shaft of the second conveying roller 9a, and a pulley 6 mounted to an end of a shaft of the first conveying roller 8a.

A pulley 14 is mounted on another end of the shaft of the first conveying roller 8a opposite to the end on which the pulley 6 is mounted. A timing belt 17 having an endless shape is wound on the pulley 14. The timing belt 17 is wound on the above described pulley 14, and a pulley 16 mounted on an end of a shaft of the first ejection roller 15a.

A gear 18 is mounted on another end of the shaft of the first ejection roller 15a opposite to the end on which the pulley 16 is mounted. The gear 18 meshes with a transmission gear 19a. The transmission gear 19a meshes with another transmission gear 19b. The transmission gear 19b meshes with a gear 21 mounted to a shaft of the second ejection roller 22a.

Further, the transmission gear 19b meshes with a clutch 20. The clutch 20 meshes with a gear 26 mounted to an end of a shaft 27 coaxially connected to the feeding roller 24a.

The feeding roller 24a and the pickup roller 23 are rotatably supported by a common holder 23a. A rotation of the feeding roller 24a is transmitted to the pickup roller 23 via a gear train 25.

With such a configuration, a rotation of the motor 13 is transmitted to the first conveying roller 8a and the second conveying roller 9a via the timing belt 12, the pulley 10, the pulley 6 and the pulley 7. The rotation of the motor 13 is further transmitted to the first ejection roller 15a via the pulley 14, the timing belt 17 and the pulley 16, and is transmitted to the second ejection roller 22a via the gear 18, the transmission gear 19a and the transmission gear 19b. The rotation of the motor 13 is further transmitted to the feeding roller 24a via the transmission gear 19b, the clutch 20 and the gear 26, and is transmitted to the pickup roller 23 via the gear train 25.

In other words, the first conveying roller 8a, the second conveying roller 9a, the first ejection roller 15a and the second ejection roller 22a (i.e., the conveying mechanism 38) are rotated by the rotation of the motor 13. Further, the pickup roller 23 and the feeding roller 24a (i.e., the feeding mechanism 37) are rotated by the rotation of the motor 13 and turning ON (i.e., rotation transmission) of the clutch 20.

Figure 6:
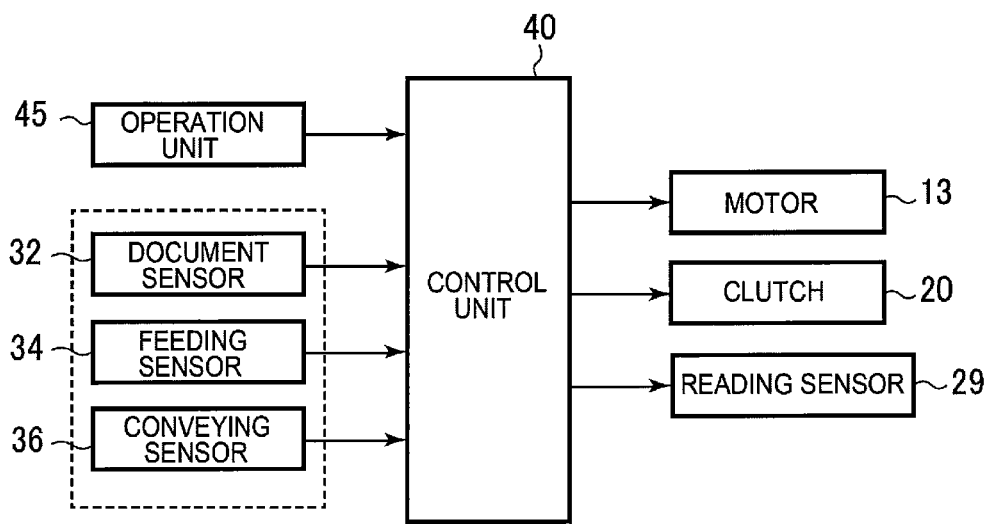
FIG. 6 is a block diagram showing a control system of the scanner unit according to the first embodiment.

FIG. 6 is a block diagram showing a control system of the scanner unit 3. The scanner unit 3 includes a control unit 40, and an operation unit 45. The control unit 40 includes a CPU (Central Processing Unit), a memory, an input/output port, a timer and the like. The operation unit 45 may be an operation panel 2a provided on a front side of the MFP 100, or a personal computer connected to the MFP 100. The operation panel 2a (FIG. 1) includes an operation section such as a switch operated by a user to input an instruction, and a display section.

The control unit 40 receives output signals (i.e., signals regarding a conveyance of the document) from the document sensor 32, the feeding sensor 34 and the conveying sensor 36. The control unit 40 performs an image reading operation based on a scan starting signal (i.e., a reading starting signal) inputted by the operation unit 45. That is, the control unit 40 drives the motor 13 and the clutch 20 to convey the document, and also drives the reading sensor 29 to read an image of the document.

In this regard, if the clutch 20 is turned OFF (i.e., turned to an OFF state where the clutch 20 cuts off transmission of rotation), loads on the first conveying roller 8a, the second conveying roller 9a and the first ejection roller 15a of the conveying mechanism 38 disappear instantly. Therefore, rotation speeds of the first conveying roller 8a, the second conveying roller 9a and the first ejection roller 15a may change. As a result, a conveying speed of the document which is being read may change, and distortion in the read image may occur. Therefore, in this embodiment, the clutch 20 is not turned OFF during the reading of the document, in order to prevent distortion in the read image.

Figure 7:
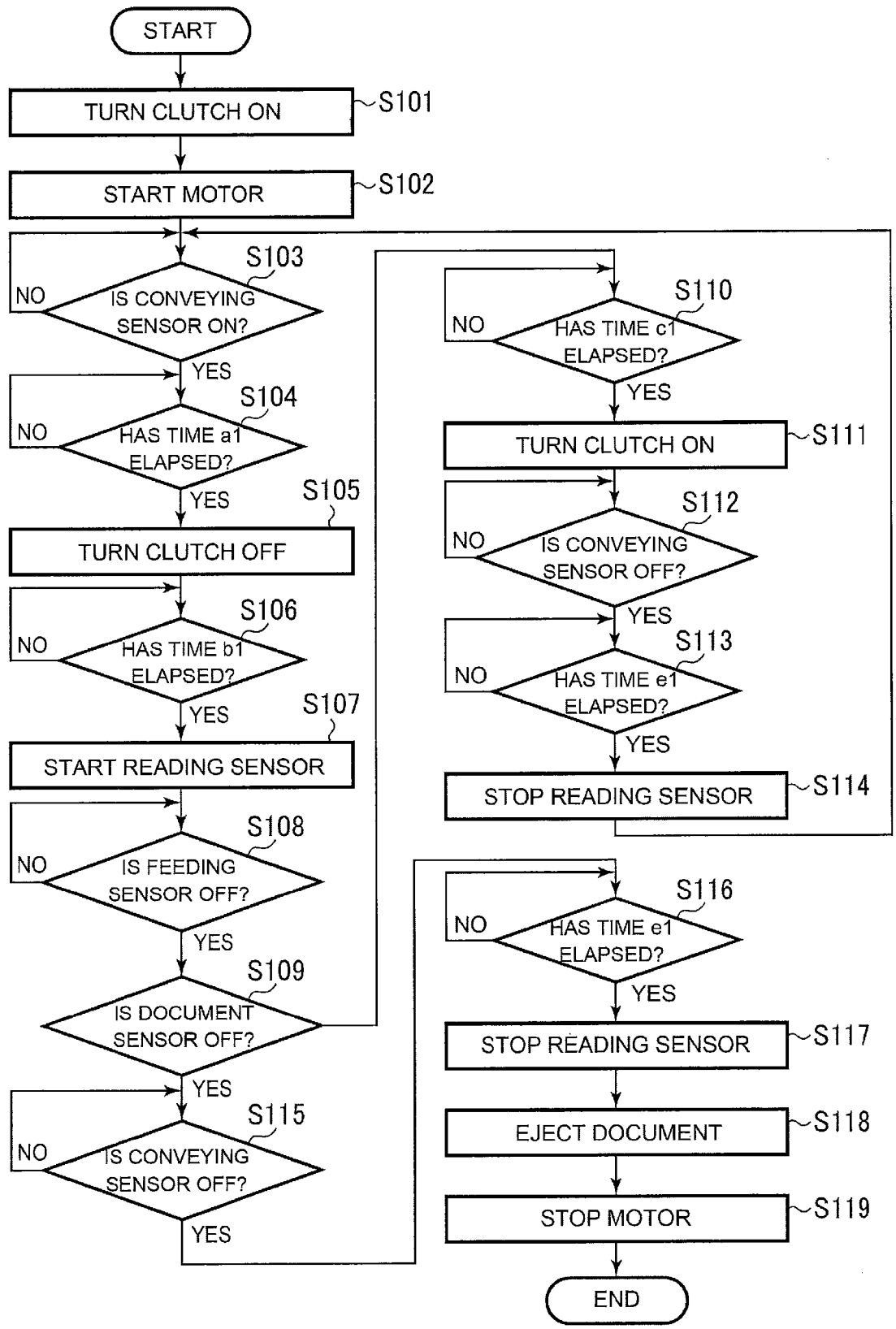
FIG. 7 is a flowchart showing an operation of the scanner unit according to the first embodiment.

Next, an operation of the scanner unit 3 will be described. FIG. 7 is a flowchart for illustrating the operation of the scanner unit 3. FIGS. 8A through 8H are timing charts for illustrating the operation of the scanner unit 3. FIGS. 9A through 9F and FIG. 10A through 10F are schematic views showing conveying states and conveying positions of the document in the scanner unit 3.

The control unit 40 receives a scan starting signal from the operation unit 45 (i.e., the operation panel 2a or the personal computer), and starts a scanning operation.

First, the control unit 40 sends a control signal to the clutch 20, and turns the clutch 20 ON (step S101). In other words, the control unit 40 turns the clutch 20 to an ON state where the clutch 20 transmits rotation (i.e., transmits a power). As the clutch 20 is turned ON, a rotation of the motor 13 is transmittable to the pickup roller 23 and the feeding roller 24a, i.e., the feeding mechanism 37 (timing T1 in FIG. 8).

The control unit 40 sends a control signal to the motor 13, and causes the motor 13 to start rotating (step S102). As the motor 13 starts rotating, the pickup roller 23, the feeding roller 24a, the first conveying roller 8a, the second conveying roller 9a, the first ejection roller 15a and the second ejection roller 22a start rotating as described above (timing T2 in FIG. 8). That is, the feeding mechanism 37 and the conveying mechanism 38 start rotating at the same time.

Figure 9A:
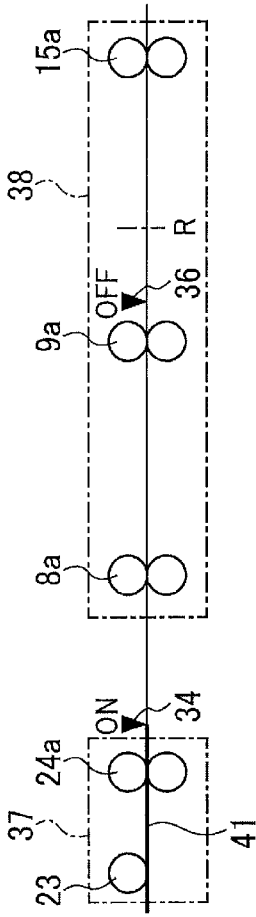
FIGS. 9A through 9F are schematic views showing conveying states and conveying positions of the document according to the first embodiment.
Figure 9B:
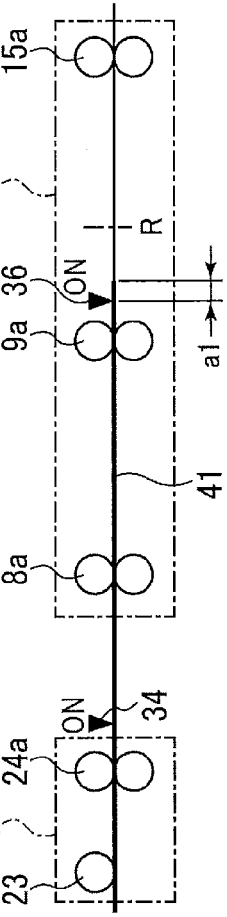

FIG. 9A shows a conveying state of the document in the ADF 1 at this stage. FIG. 9B shows a conveying position of the document when the conveying path is illustrated as a linear line. The pickup roller 23 rotates to feed the uppermost document (indicated by numeral 41) from the documents set in the document setting position 33. The feeding roller 24a rotates to feed the document 41. When a leading edge of the document 41 reaches the feeding sensor 34, the feeding sensor 34 outputs an ON signal. In other words, an output signal of the feeding sensor 34 becomes ON.

Further, the first conveying roller 8a, the second conveying roller 9a, the first ejection roller 15a and the second ejection roller 22a (i.e., the conveying mechanism 38) convey the document 41 toward the reading position R.

When the leading edge of the document 41 reaches the conveying sensor 36 downstream of the second conveying roller 9a, an output signal of the conveying sensor 36 becomes ON (step S103; timing T3 in FIG. 8). When the output signal of the conveying sensor 36 becomes ON, the control unit 40 waits for a time required for the document 41 to travel a distance a1 (mm) from the point of time at which the output signal of the conveying sensor 36 becomes ON (step S104). Upon lapse of the time required for the document 41 to travel the distance a1, the control unit 40 turns the clutch 20 OFF (step S105; timing T4 in FIG. 8). In step S104 of FIG. 8, the time required for the document to travel the distance a1 (mm) is expressed as "time a1" for the sake of simplicity. The same can be said for other steps in FIG. 8 and other flowcharts.

Figure 9C:
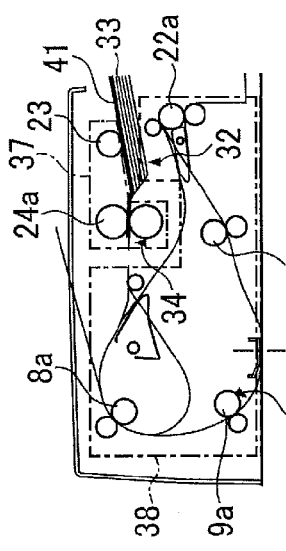
Figure 9D:
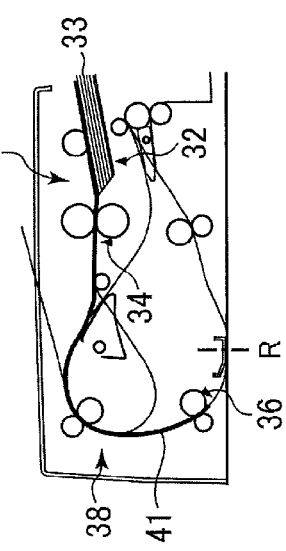

FIGS. 9C and 9D show a conveying state and a conveying position of the document 41 in the ADF 1 at this stage. The document 41 does not reach the reading position R, and therefore the reading sensor 29 does not start reading. Since the clutch 20 is turned OFF, the transmission of rotation to the feeding mechanism 37 (i.e., the pickup roller 23 and the feeding roller 24a) is cut off. That is, the document 41 is conveyed by the conveying mechanism 38 (i.e., the first conveying roller 8a, the second conveying roller 9a, the first ejection roller 15a and the second ejection roller 22a).

In this regard, the pickup roller 23 and the feeding roller 24a of the feeding mechanism 37 are freely rotatable when the clutch 20 is in the OFF state. Therefore, while the document 41 is conveyed by the conveying mechanism 38, the pickup roller 23 and the feeding roller 24a rotate following the document which is being conveyed.

The control unit 40 waits for a time required for the document 41 to travel a distance b1 (mm) from the point of time at which the output signal of the conveying sensor 36 becomes ON (step S106). Upon lapse of the time required for the document 41 to travel the distance b1, the control unit 40 sends a control signal to the reading sensor 29 to start reading the document 41 (step S107; timing T5 in FIG. 8).

Figure 9E:
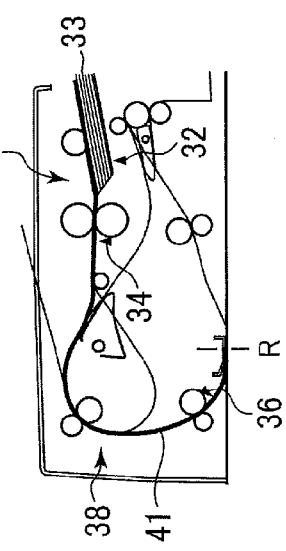
Figure 9F:
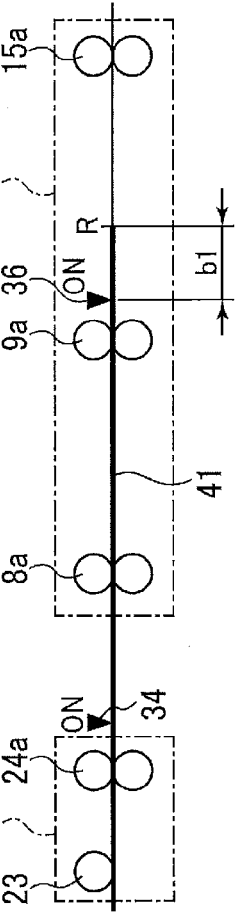

FIGS. 9E and 9F show a conveying state and a conveying position of the document 41 in the ADF 1 at this stage. The distance b1 corresponds to a distance from the conveying sensor 36 to the reading position R. That is, the reading sensor 29 starts reading the document 41 when the leading edge of the document 41 reaches the reading position R.

Then, the reading sensor 29 reads line images of the document, while the conveying mechanism 38 conveys the document 41.

When the document 41 is further conveyed, and a trailing edge of the document 41 passes the feeding sensor 34, the output signal of the feeding sensor 34 becomes OFF (timing T6 in FIG. 8). When the output signal of the feeding sensor 34 is ON (step S108), the control unit 40 checks whether the output signal of the document sensor 32 is ON or OFF (step S109). If the output signal of the document sensor 32 is ON, it means that a subsequent document is set in the document setting position 33. If the output signal of the document sensor 32 is OFF, it means that no subsequent document is set in the document setting position 33.

When the output signal of the document sensor 32 is ON (i.e., if the subsequent document is set in the document setting position 33) in the above described step S109, the control unit 40 proceeds to step S110 and waits for a time required for the document 41 to travel a distance c1 (mm) from the point of time at which the output signal of the feeding sensor 34 becomes OFF. Upon lapse of the time required for the document 41 to travel the distance c1, the control unit 40 sends a control signal to the clutch 20 to turn the clutch 20 ON (step S111; timing T7 in FIG. 8). Therefore, the feeding mechanism 37 starts rotating.

FIGS. 10A and 10B show conveying states and conveying positions of the documents 41 and 42 in the ADF 1 at this stage. A distance (i.e., a sheet-to-sheet distance) between the trailing edge of the preceding document 41 and a leading edge of the subsequent document 42 is a constant value d1 (mm). The feeding mechanism 37 feeds the subsequent document 42 set in the document setting position 33.

Then, the preceding document 41 is read by the reading sensor 29, while the document 41 is conveyed by the conveying mechanism 38. The subsequent document 42 is fed by the feeding mechanism 37, and is conveyed by the conveying mechanism 38. While the subsequent document 42 is fed, the output signal of the feeding sensor 34 becomes ON.

When the trailing edge of the preceding document 41 passes the conveying sensor 36, the output signal of the conveying sensor 36 becomes OFF (step S112; timing T8 in FIG. 8). Then, the control unit 40 waits for a time required for the document 41 to travel a distance e1 (mm) from the point of time at which the output signal of the conveying sensor 36 becomes OFF (step S113). Upon lapse of the time required for the document 41 to travel the distance e1, the control unit 40 causes the reading sensor 29 to end reading (step S114; timing T9 in FIG. 8). In this way, the reading operation of the document 41 is completed.

FIGS. 10C and 10D show conveying states and conveying positions of the documents 41 and 42 in the ADF 1 at this stage. The reading sensor 29 ends reading when the trailing edge of the preceding document 41 passes the reading position R. The document 41 is further conveyed by the conveying mechanism 38, and is ejected from the ADF 1.

When the leading edge of the subsequent document 42 passes the conveying sensor 36, the output signal of the conveying sensor 36 becomes ON (step S103; timing T10 in FIG. 8). The control unit 40 waits for a time required for the document 42 to travel the distance a1 (mm) from the point of time at which the output signal of the conveying sensor 36 becomes ON (step S104). Upon lapse of the time required for the document 42 to travel the distance a1, the control unit 40 sends an control signal to the clutch 20 to turn the clutch 20 OFF (step S105; timing T11 in FIG. 8). In this way, the transmission of rotation to the feeding mechanism 37 is cut off.

FIGS. 10E and 10F show conveying states and conveying positions of the documents 41 and 42 in the ADF 1 at this stage. The subsequent document 42 does not reach the reading position R, and therefore the reading sensor 29 does not start reading. Since the clutch 20 is turned OFF, the transmission of rotation to the feeding mechanism 37 is cut off. That is, the subsequent document 42 is conveyed by the conveying mechanism 38.

The above described steps S103 through S114 are repeated until no document is left in the document setting position 33 (until the output signal of the document sensor 32 becomes OFF).

When the output signal of the document sensor 32 becomes OFF (step S109; timing T12 in FIG. 8), the control unit 40 proceeds to step S115 and waits until the output signal of the conveying sensor 36 becomes OFF. That is, the control unit 40 waits until the trailing edge of the last document passes the conveying sensor 36.

Then, when the output signal of the conveying sensor 36 becomes OFF (timing T13 in FIG. 8), the control unit 40 proceeds to step S116 and waits for a time required for the document to travel the distance e1. Upon lapse of the time required for the document to travel the distance e1, the control unit 40 sends a control signal to the reading sensor 29 to end reading (step S117; timing T14 in FIG. 8). That is, the reading sensor 29 ends reading after the trailing edge of the last document passes the reading position R. In this way, the reading operation of the last document is completed.

Then, upon lapse of a time required for the trailing edge of the last document to be ejected from the ADT 1 (step S118), the control unit 40 stops the motor 13 (step S119; timing T15 in FIG. 8). That is, the conveying mechanism 38 stops rotating.

As described above, in this embodiment, the clutch 20 is not turned OFF during the reading of document by the reading sensor 29. Therefore, it becomes possible to prevent a change in the conveying speed of the document caused by changes in the loads on the respective rollers of the conveying mechanism 38. Thus, it becomes possible to prevent occurrence of distortion in the read image.

Next, Comparison Example will be described for comparison with this embodiment. In Comparison Example, the clutch 20 is turned OFF during the reading of the document.

Figure 11:
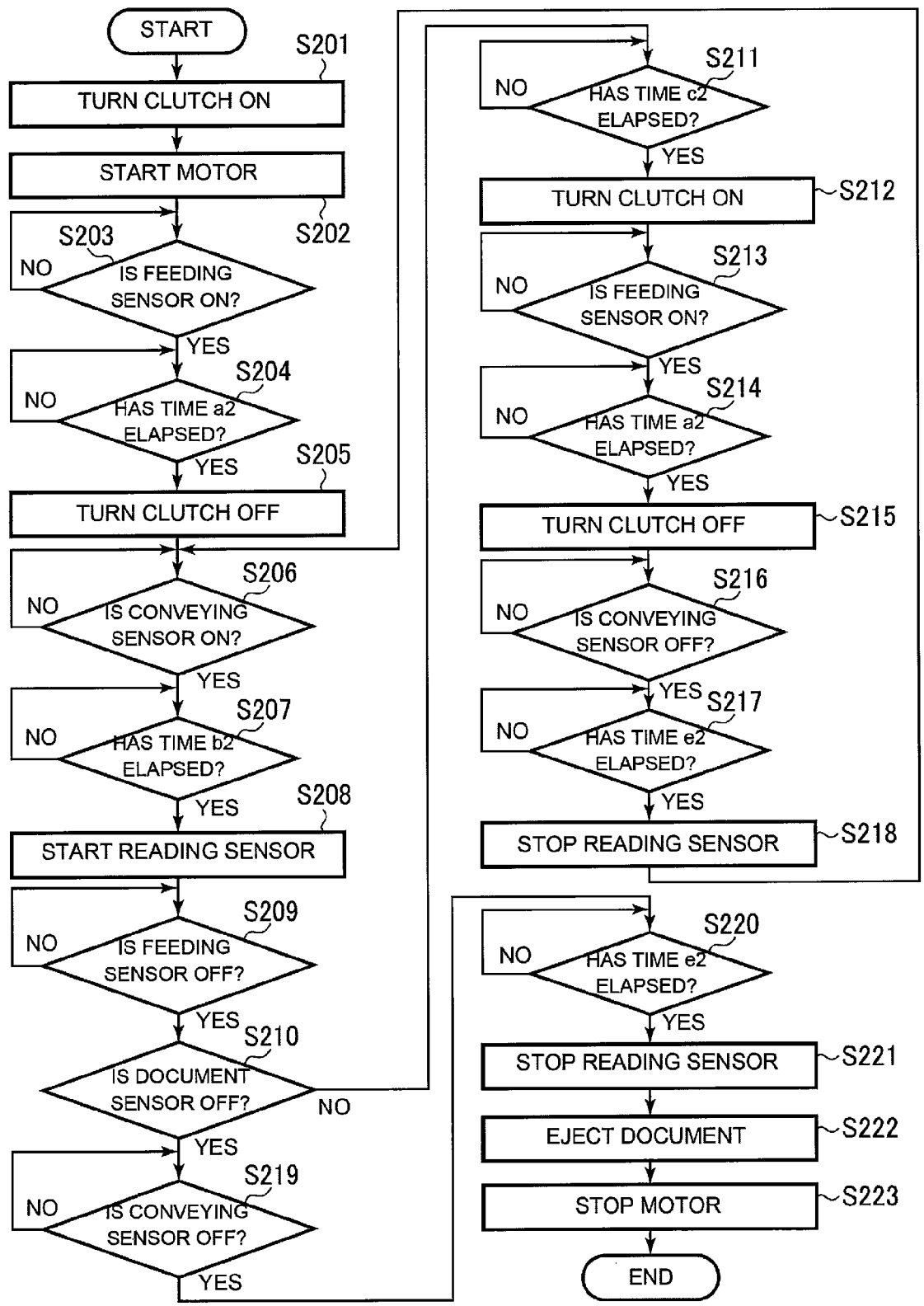
FIG. 11 is a flowchart showing an operation of a scanner unit of Comparison Example.

FIG. 11 is a flowchart showing an operation of the Comparison Example. FIGS. 12A through 12F and FIGS. 13A through 13F show conveying states and conveying positions of the document in Comparison Example.

In FIG. 11, processing of steps S201 and S202 are the same as those of steps S101 and S102 shown in FIG. 7. When the control unit 40 receives the scan starting signal from the operation unit 45, the control unit 40 turns the clutch 20 OFF (step S201), and causes the motor 13 to start rotating (step S202).

FIGS. 12A and 12B show a conveying state and a conveying position of the document 41 in the ADF 1 at this stage. The feeding mechanism 37 feeds the uppermost document 41 from the documents set in the document setting position 33. When the leading edge of the document 41 reaches the feeding sensor 34, the output signal of the feeding sensor 34 becomes ON.

The control unit 40 checks whether the output signal of the feeding sensor 34 becomes ON (step S203). When the output signal of the feeding sensor 34 becomes ON, the control unit 40 waits for a time required for the document 41 to travel a distance a2 (mm) (step S204). Upon lapse of the time required for the document 41 to travel the distance a2, the control unit 40 turns the clutch 20 OFF (step S205). In this way, the transmission of rotation to the feeding mechanism 37 is cut off.

FIGS. 12C and 12D show a conveying state and a conveying position of the document 41 in the ADF 1 at this stage. The leading edge of the document 41 reaches the first conveying roller 8a of the conveying mechanism 38, and therefore the document 41 is conveyed by the conveying mechanism 38 after the transmission of rotation to the feeding mechanism 37 is cut off. When the leading edge of the document 41 reaches the conveying sensor 36, the output signal of the conveying sensor 36 becomes ON.

When the output signal of the conveying sensor 36 becomes ON (step S206), the control unit 40 waits for a time required for the document 41 to travel a distance b2 (mm) (step S207). Upon lapse of the time required for the document 41 to travel the distance b2, the control unit 40 causes the reading sensor 29 to start reading (step S208).

FIGS. 12E and 12F show a conveying state and a conveying position of the document 41 in the ADF 1 at this stage. The distance b2 corresponds to a distance from the conveying sensor 36 to the reading position R. That is, the reading sensor 29 starts reading the document 41 when the leading edge of the document 41 reaches the reading position R.

Then, the reading sensor 29 reads line images of the document, while the conveying mechanism 38 conveys the document 41.

When the document 41 is further conveyed, and the trailing edge of the document 41 passes the feeding sensor 34, the output signal of the feeding sensor 34 becomes OFF. When the output signal of the feeding sensor 34 becomes OFF (step S209), the control unit 40 checks whether the output signal of the document sensor 32 is ON or OFF (step S210).

When the output signal of the document sensor 32 is ON (i.e., when a subsequent document is set in the document setting position 33), the control unit 40 waits for a time required for the document 41 to travel a distance c2 (mm) from the point of time at which the feeding sensor 34 becomes OFF (step S211). Upon lapse of the time required for the document 41 to travel the distance c2, the control unit 40 turns the clutch 20 ON (step S212). In this way, the feeding mechanism 37 starts rotating.

Figure 13A:
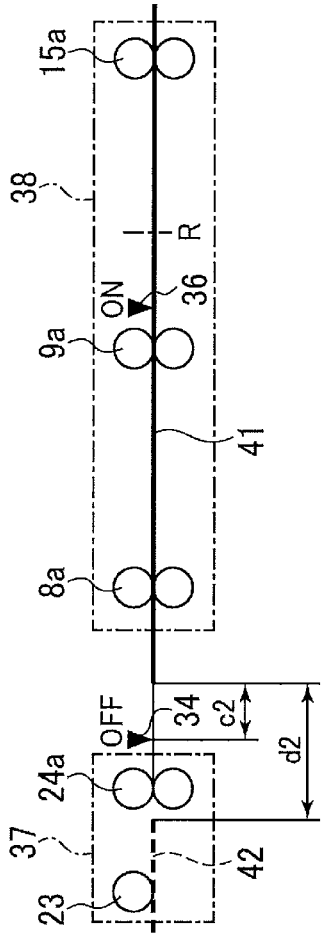
FIGS. 13A through 13F are schematic views showing conveying states and conveying positions of the document according to Comparison Example.
Figure 13B:
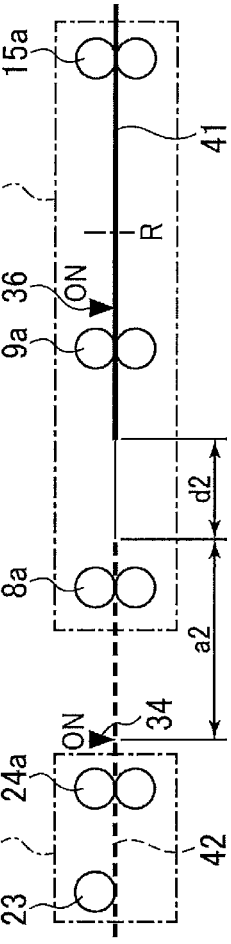

FIGS. 13A and 13B show conveying states and conveying positions of the documents 41 and 42 in the ADF 1 at this stage. A distance (i.e., a sheet-to-sheet distance) between the trailing edge of the preceding document 41 and the leading edge of the subsequent document 42 is a constant value d2 (mm). The feeding mechanism 37 feeds the subsequent document 42 set in the document setting position 33, and the conveying mechanism 38 conveys the document 42.

Then, the preceding document 41 is read by the reading sensor 29, while the document 41 is conveyed by the conveying mechanism 38. When the leading edge of the document 42 fed by the feeding mechanism 37 reaches the feeding sensor 34, the output signal of the feeding sensor 34 becomes ON.

When the output signal of the feeding sensor 34 becomes ON (step S213), the control unit 40 proceeds to step S214 and waits for a time required for the document 42 to travel the distance a2 (mm) (step S214). Upon lapse of the time required for the document to travel the distance a2, the control unit 40 turns the clutch 20 OFF (step S215). In this way, the transmission of rotation to the feeding mechanism 37 is cut off.

Figure 13C:
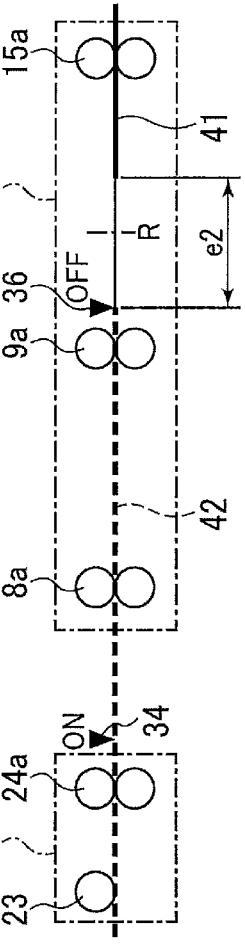
Figure 13D:
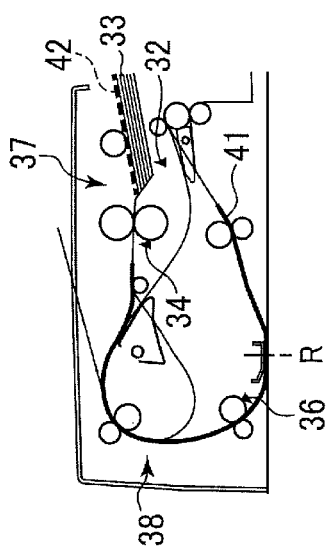

FIGS. 13C and 13D show conveying states and conveying positions of the documents 41 and 42 in the ADF 1 at this stage. Since the transmission of rotation to the feeding mechanism 37 is cut off, the subsequent document 42 is conveyed by the conveying mechanism 38.

When the trailing edge of the preceding document 41 (conveyed by the conveying mechanism 38) passes the conveying sensor 36, the output signal of the conveying sensor 36 becomes OFF (step S216). Then, the control unit 40 waits for a time required for the document 41 to travel a distance e2 (mm) from the point of time at which the output signal of the conveying sensor 36 becomes OFF (step S217). Upon lapse of time required for the document 41 to travel the distance e2 the control unit 40 causes the reading sensor 29 to end reading (step S218).

Figure 13E:
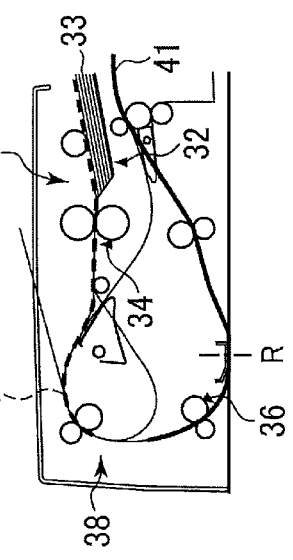
Figure 13F:
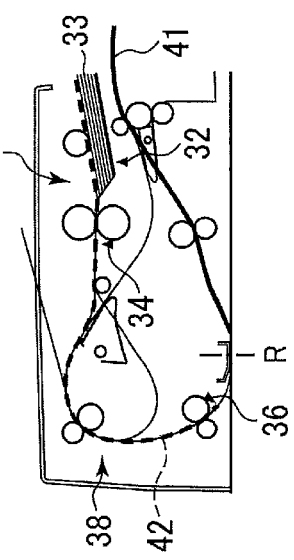

FIGS. 13E and 13F show conveying states and conveying positions of the documents 41 and 42 in the ADF 1 at this stage. When the trailing edge of the preceding document 41 passes the reading position R, the reading sensor 29 ends reading. The document 41 is further conveyed by the conveying mechanism 38, and is ejected from the ADF 1.

The above described steps S206 through S218 are repeated until no document is left in the document setting position 33 (until the output signal of the document sensor 32 becomes OFF).

When the output signal of the document sensor 32 becomes OFF (step S210), the control unit 40 waits until the output signal of the conveying sensor 36 becomes OFF (step S219). That is, the control unit 40 waits until the trailing edge of the last document passes the conveying sensor 36.

Then, when the output signal of the conveying sensor 36 is OFF, the control unit 40 proceeds to step S220 and waits for a time required for the document to travel the distance e2 (mm). Then, upon lapse of the time required for the document to travel the distance e2, the control unit 40 sends a control signal to the reading sensor 29 to end reading (step S221). In this way, the reading operation of the last document is completed.

Then, upon lapse of the time required for the trailing edge of the last document to be ejected from the ADT 1 (step S222), the control unit 40 stops the motor 13 (step S223). In this way, the conveying mechanism 38 stops rotating.

As described above, in Comparison Example, the clutch 20 is turned OFF when the subsequent document 42 (fed by the feeding mechanism 37) reaches the first conveying roller 8a (step S215). Therefore, the clutch 20 is turned OFF while the preceding document 41 is being read by the reading sensor 29. When the clutch 20 is turned OFF, the loads on the respective rollers of the conveying mechanism 38 disappear instantly, and therefore the rotation speeds of the respective rollers of the conveying mechanism 38 may change. As a result, the conveying speed of the document 41 (conveyed by the conveying mechanism 38) may change while the document 41 is read by the reading sensor 29, and distortion in the read image may occur.

Here, the change in the conveying speed and the distortion of the image will be described. FIGS. 14A and 14B respectively show an original image of the document and a read image when there is no change in the conveying speed. FIGS. 14C and 14D respectively show an original image of the document and a read image when there is a change in the conveying speed.

In FIG. 14A, if there is no change in the conveying speed, it is assumed that one line is thinned out for every two lines of the document as shown by mark A. In this case, it is assumed that the read image as shown in FIG. 14B is obtained.

In FIG. 14C, if there arises a change in the conveying speed, for example, two consecutive lines (shown by mark B) may be thinned out at a portion (shown by mark C) where the conveying speed of the document decreases. As a result, as shown in FIG. 14D, the read image includes a part where two consecutive lines are thinned out and a part where one line is thinned out. This may appear as distortion in the image.

FIG. 15A is a schematic view showing an example of distortion in the image caused by the change in the conveying speed. FIGS. 15B through 15E are schematic view showing a cause of the distortion in the image.

In the example shown in FIG. 15A, lines L1 and L2 which are inclined at certain angles with respect to the conveying direction of the document are read. If there is a change in the conveying speed, distortions as shown by marks Q1 and Q2 occur. The reason will be described below.

FIG. 15B shows a line L1 when there is no change in the conveying speed. Reading points (in this example, three points) on the line L1 which are read by the reading sensor 29 at constant time intervals when there is no change in the conveying speed are expressed as mark P1.

In contrast, as shown in FIG. 15C, when there arises a change (in this example, an increase) in the conveying speed of the document, a distance between reading points P2 on the line L2 which are read by the reading sensor 29 at constant time intervals becomes wider than a distance between the reading points P1 (FIG. 15B) when there is no change in the conveying speed.

As a result, a reading image to be read as a straight line as shown in FIG. 15D is read as a distorted line as shown in FIG. 15E. In the line shown in FIG. 15E, a part which is read when the conveying speed increases is inclined more moderately than other part of the line.

In contrast, in this embodiment, the change in the conveying speed of the document is suppressed, and therefore occurrence of distortion in the image can be prevented.

That is, in this embodiment, even when the document 42 (fed by the feeding mechanism 37) reaches the first conveying roller 8a of the conveying mechanism 38, the clutch 20 is not turned OFF immediately. Instead, the clutch 20 is turned OFF after the reading of the preceding document 41 is completed (steps S112-114 and steps S103-S105). Since the clutch 20 is not turned OFF while the document 41 is being read by the reading sensor 29, it becomes possible to suppress the change in the conveying speed caused by the changes in the loads on the respective rollers of the conveying mechanism 38. As a result, occurrence of distortion in the read image can be prevented.

In this regard, in this embodiment, the clutch 20 is turned ON (for feeding the subsequent document 42) while the preceding document 41 is being read (step S111). When the clutch 20 is turned ON, the number of rollers driven by the motor 13 increases, and therefore the loads on the respective rollers of the conveying mechanism 38 may increase. However, in this case, a large change in the conveying speed is unlikely to occur as compared with the case where large loads disappear instantly (i.e., when the clutch 20 is turned OFF). Accordingly, distortion in the read image is unlikely to occur even when the clutch 20 is turned ON during the reading of the document 41.

As described above, according to the first embodiment of the present invention, the clutch 20 is turned OFF (for cutting off the transmission of the rotation to the feeding mechanism 37) after the reading of the preceding document 41 is completed. Since the clutch 20 is not turned OFF during the reading of the preceding document 41, changes in the loads on the respective rollers of the conveying mechanism 38 can be suppressed. Therefore, it becomes possible to suppress the change in the conveying speed of the document which is being read, and to prevent occurrence of distortion in the read image.

In this regard, in this embodiment, the clutch 20 is turned OFF upon lapse of the time required for the document 42 to travel the distance a1 from the point of time at which the leading edge of the document 42 passes the conveying sensor 36 (steps S103 through S105). In other words, the clutch 20 is turned OFF when it is determined the trailing edge of the preceding document 41 passes the reading position R. However, it is also possible to detect that the trailing edge of the preceding document 41 passes the reading position R using other method, and to turn the clutch 20 OFF based on the detection.

Figure 16:
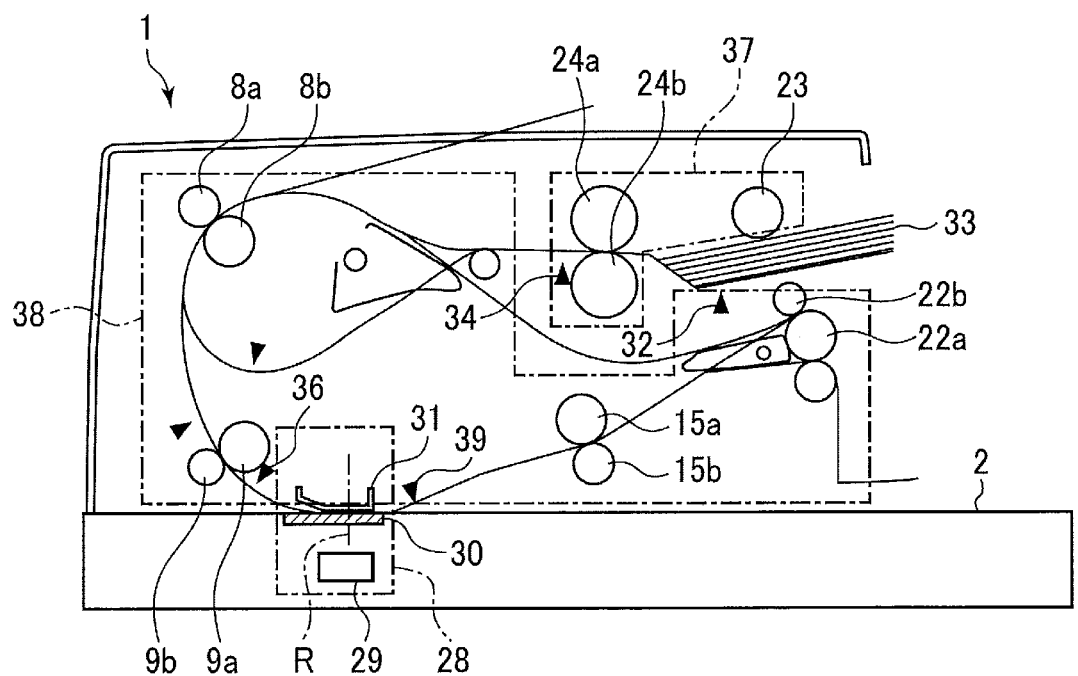
FIG. 16 is a schematic view showing a modification of the scanner unit according to the first embodiment.

For example, as shown in FIG. 16, a second conveying sensor (i.e., a second conveyance detection unit) may be provided downstream of the reading position R. In this case, when the second conveying sensor 39 detects the passage of the trailing edge of the preceding document 41, the clutch 20 is turned OFF on condition that the conveying sensor 36 does not detect the subsequent document 42. With such a configuration, the clutch 20 is turned OFF in a state where neither of the documents 41 and 42 is in the reading position R. Therefore, it becomes possible to surely prevent the change in the conveying speed of the document which is being read.

Second Embodiment

Next, the second embodiment of the present invention will be described.

In the above described first embodiment, the distance (i.e., the sheet-to-sheet distance) between the preceding document 41 and the subsequent document 42 is a constant value (d1). However, there may be cases where the subsequent document 42 may be closer to the feeding roller 24a or the feeding sensor 34. This case may occur when the subsequent document 42 is dragged by the preceding document 41 which is being fed, or when the subsequent document 42 may be incorrectly set on the document table 5. In such a case, the distance between the preceding document 41 and the subsequent document 42 becomes shorter than the above described constant value (d1).

Figure 17A:
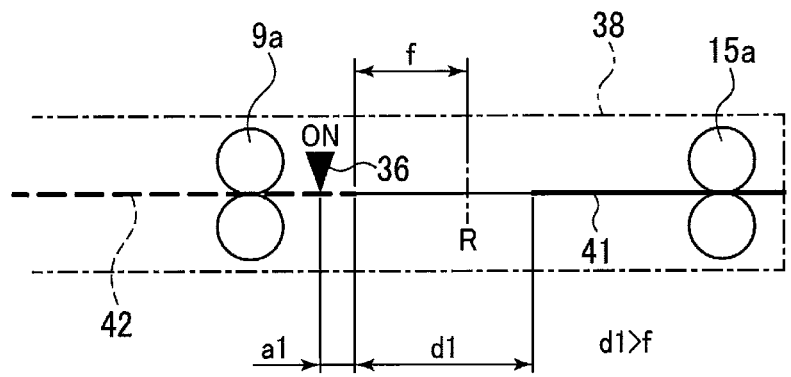
FIGS. 17A through 17C are schematics view showing conveying states of a preceding document and a subsequent document when a distance therebetween changes.

FIG. 17A is an enlarged view showing a conveying path between the second conveying roller 9a and the first ejection roller 15a shown in FIG. 10F. In FIG. 17A, the distance d1 between the preceding document 41 and the subsequent document 42 is longer than a distance f between the leading edge of the subsequent document 42 and the reading position R when the clutch 20 is turned OFF.

Figure 17B:
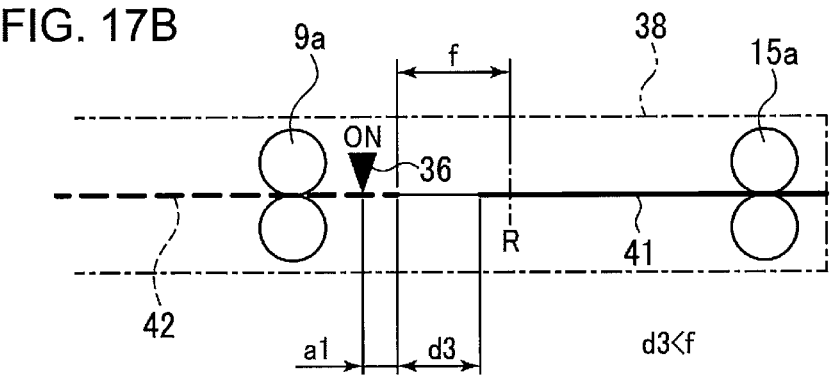

In contrast, FIG. 17B shows a case where the distance d3 between the subsequent document 41 and the preceding document 42 is shorter than the distance f. In the case shown in FIG. 17B, if the clutch 20 is turned OFF upon lapse of a predetermined time from the point of time at which the leading edge of the subsequent document 42 passes the conveying sensor 36 as described in the first embodiment (steps S103 through S105 in FIG. 6), it results in that the clutch 20 is turned OFF before the preceding document 41 passes the reading position R. This may cause the distortion in the image.

Figure 17C:
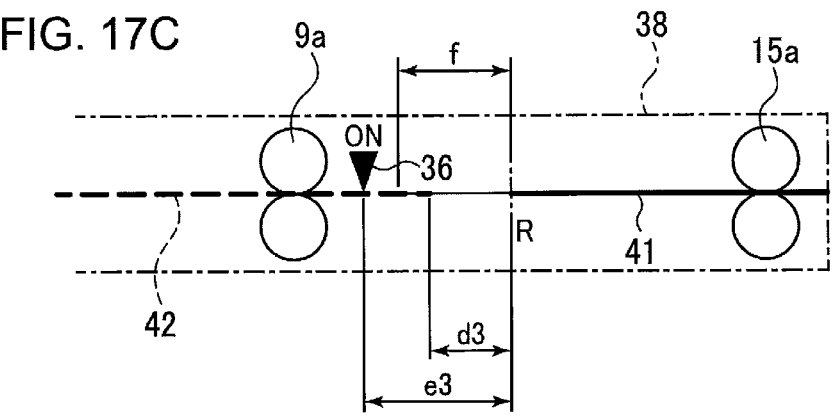

For this reason, in the second embodiment, as shown in FIG. 17C, the clutch 20 is turned OFF upon lapse of a time required for the preceding document 41 to travel a distance e3 from the point of time at which the trailing edge of the document 41 passes the conveying sensor 36. With such an arrangement, the clutch 20 is not turned OFF during the reading of the document 41 even if the distance between the preceding document 41 and the subsequent document 42 becomes shorter.

In this regard, the configuration of the scanner unit 3 and the configuration of the MFP 100 including the scanner unit 3 are the same as those described in the first embodiment.

Figure 18:
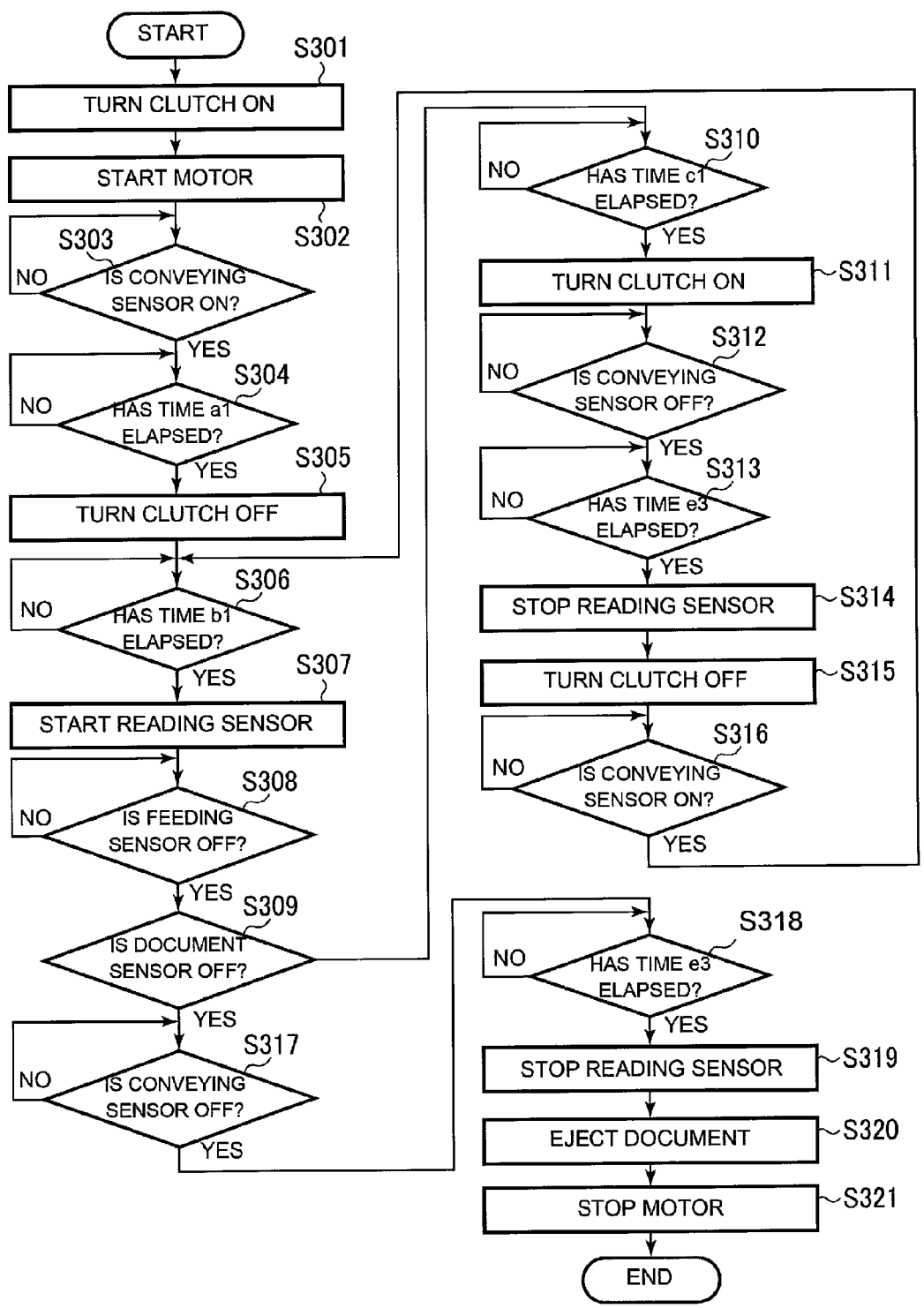
FIG. 18 is a flowchart showing an operation of a scanner unit according to the second embodiment of the present invention.

FIG. 18 is a flowchart for illustrating an operation of the second embodiment. FIGS. 19A through 19H are timing charts for illustrating the operation of the second embodiment. FIGS. 20A through 20D are schematic views showing conveying states and conveying positions of the documents in the second embodiment. Processing of steps S301 through S311 of FIG. 18 are the same as the processing of steps S101 through S111 of FIG. 7.

In this embodiment, when the trailing edge of the preceding document 41 passes the conveying sensor 36 and the output signal of the conveying sensor 36 becomes OFF (step S312; timing T8 in FIG. 19), the control unit 40 proceeds to step S313 and waits for a time required for the document 41 to travel the distance e3 (mm). Upon lapse of the time required for the document 41 to travel the distance e3, the control unit 40 causes the reading sensor 29 to end reading (step S314), and turns the clutch 20 OFF (step S315; timing T9 in FIG. 19).

FIGS. 20A and 20B show the conveying states and the conveying positions of the documents 41 and 42 in the ADF 1 at this stage. When the trailing edge of the preceding document 41 passes the reading position R, the reading sensor 29 ends reading, and the clutch 20 is turned OFF. Then, the document 41 is further conveyed by the conveying mechanism 38, and is ejected from the ADF 1.

When the leading edge of the subsequent document 42 passes the conveying sensor 36 and the output signal of the conveying sensor 36 becomes ON (step S316; timing T10 in FIG. 19), the control unit 40 proceeds to step S306 and waits for a time required for the subsequent document 42 travels the distance b1 (mm). Upon lapse of the time required for the document 42 travels the distance b1, the control unit 40 sends a control signal to the reading sensor 29 to start reading the document 42 (step S307; timing T11 in FIG. 19).

FIGS. 20C and 20D show the conveying states and the conveying positions of the documents 41 and 42 in the ADF 1 at this stage. When the subsequent document 42 travels the distance b1 (mm) from the conveying sensor 36 and reaches the reading position R, the reading sensor 29 starts reading.

The above described steps S306 through S316 are repeated until no document is left in the document setting position 33. Processing in the case where no document is left in the document setting position 33 (steps S317 through S321) are the same as the processing of steps S115 through S119 of FIG. 7 described in the first embodiment.

As described above, in the second embodiment of the present invention, the clutch 20 is turned OFF upon lapse of the predetermined time from the point of time at which the trailing edge of the preceding document 41 passes the conveying sensor 36. Therefore, even if the distance between the preceding document 41 and the subsequent document 42 becomes shorter, the clutch 20 is not turned OFF while the preceding document 41 is being read. Therefore, it becomes possible to surely prevent occurrence of distortion in the image.

In the first and second described embodiments, a length of the document is longer than the distance between the feeding sensor 34 and the conveying sensor 36. A configuration where the length of the document is shorter than the distance between the feeding sensor 34 and the conveying sensor 36 will be described in the third embodiment.

Third Embodiment

Next, the third embodiment of the present invention will be described.

In the third embodiment, the document whose length is shorter than the distance between the feeding sensor 34 and the conveying sensor 36 is used. An example of such a document is, for example, a document of A5 size or smaller. Such a document is not suitable for a conveyance control described in the first embodiment. Hereinafter, description will first be made of a case where the document size is B5 or larger (i.e., suitable for the conveyance control described in the first embodiment). Then, description will be made of a case where the document size is A5 or smaller.

Figure 21:
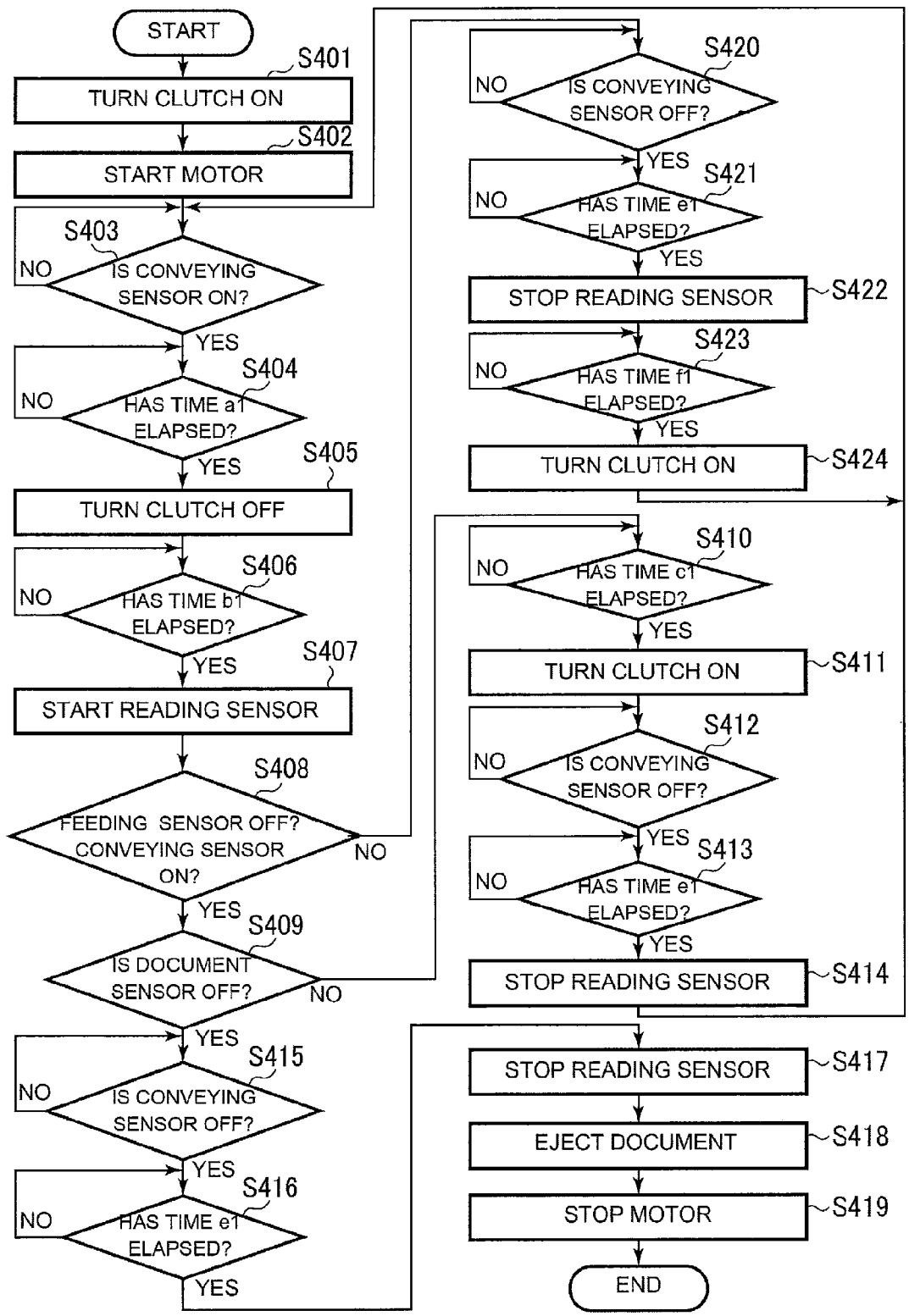
FIG. 21 is a flowchart showing an operation of a scanner unit according to the third embodiment of the present invention.

FIG. 21 is a flowchart for illustrating an operation of the scanner unit 3 according to the third embodiment. FIGS. 22A through 22H are timing charts for illustrating the operation in the case where the document size is B5 or larger. FIGS. 23A through 23F and FIGS. 24A through 24F are schematic views showing conveying states in the case where the document size is B5 or larger.

First, the conveyance control in the case where the document size is B5 or larger will be described with reference to the flowchart of FIG. 21, the timing charts of FIGS. 22A through 22H and schematic views of FIGS. 23A through 23F and FIGS. 24A through 24F.

The control unit 40 receives the scan starting signal from the operation unit 45, and starts the scanning operation. First, the control unit 40 sends a control signal to the clutch 20 to turn the clutch 20 ON (step S401). As the clutch 20 is turned ON, the rotation of the motor 13 is transmittable to the feeding mechanism 37 (timing T1 in FIG. 22).

Then, the control unit 40 sends a control signal to the motor 13, and causes the motor 13 to start rotating (step S402). As the motor 13 starts rotating, the feeding mechanism 37 and the conveying mechanism 38 start rotating (timing T2 in FIG. 22).

FIGS. 23A and 23B show a conveying state and a conveying position of the document 41 in the ADF 1 at this stage. The feeding mechanism 37 feeds the uppermost document 41 from the documents set in the document setting position 33. When the leading edge of the document 41 reaches the feeding sensor 34, the output signal of the feeding sensor 34 becomes ON.

Further, the conveying mechanism 38 conveys the document 41 (fed by the feeding mechanism 37) toward the reading position R. When the leading edge of the document 41 reaches the conveying sensor 36, the output signal of the conveying sensor 36 becomes ON (timing T3 in FIG. 22).

FIGS. 23C and 23D show a conveying state and a conveying position of the document 41 in the ADF 1 at this stage. When the leading edge of the document 41 reaches the conveying sensor 36, the trailing edge of the document 41 stays upstream of the pickup roller 23, and therefore the subsequent document 42 is not fed.

When the output signal of the conveying sensor 36 becomes ON (step S403), the control unit 40 proceeds to step S404 and waits for a time required for the document 41 to travel the distance a1 (mm). Upon lapse of the time required for the document 41 to travel the distance a1, the control unit 40 turns the clutch 20 OFF (step S405; timing T4 in FIG. 22). In this regard, when the clutch 20 is turned OFF, the trailing edge of the preceding document 41 does not pass the feeding sensor 34, and therefore the output signal of the feeding sensor 34 remains ON.

Since the clutch 20 is turned OFF, the transmission of rotation to the feeding mechanism 37 is cut off. That is, the preceding document 41 is conveyed by the conveying mechanism 38.

Then, the control unit 40 waits for a time required for the document 41 to travel the distance b1 (mm) from the point of time at which the output signal of the conveying sensor 36 becomes ON (step S406). Upon lapse of the time required for the document 41 to travel the distance b1, the control unit 40 sends a control signal to the reading sensor 29 to start reading the document 41 (step S407; timing T5 in FIG. 22).

FIGS. 23E and 23F show a conveying state and a conveying position of the document 41 in the ADF 1 at this stage. The distance b1 corresponds to a distance from the conveying sensor 36 to the reading position R. That is, the reading sensor 29 starts reading the document 41 when the leading edge of the document 41 reaches the reading position R.

Then, the reading sensor 29 reads line images of the document, while the conveying mechanism 38 conveys the document 41. When the document 41 is further conveyed, and the trailing edge of the document 41 passes the feeding sensor 34, the output signal of the feeding sensor 34 becomes OFF (timing T6 in FIG. 22).

Figure 24A:
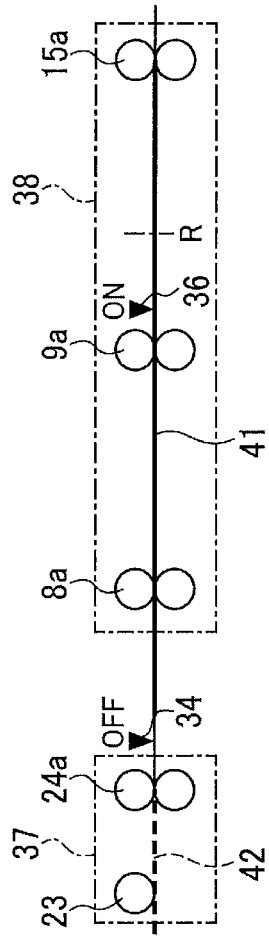
FIGS. 24A through 24F are schematic views showing conveying states and conveying positions of the document according to the third embodiment in the case where the document size is B5 or larger.
Figure 24B:
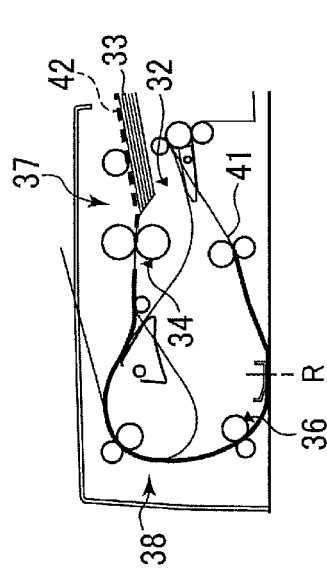

FIGS. 24A and 24B show conveying states and conveying positions of the documents 41 and 42 in the ADF 1 at this stage. When the output signal of the feeding sensor 34 becomes OFF, the document 41 is still on the conveying sensor 36, and therefore the output signal of the conveying sensor 36 is ON.

Then, the control unit 40 checks whether a current state is a state where "the output signal of the feeding sensor 34 is OFF and the output signal of the conveying sensor 36 is ON" (step S408). In the case where the document size is B5 or larger, the state where "the output signal of the feeding sensor 34 is OFF and the output signal of the conveying sensor 36 is ON" is reached as shown in FIGS. 24A and 24B. Therefore, the control unit 40 performs processing (step S409 through S414) for the document whose size is B5 or larger as described below.

First, the control unit 40 checks whether the output signal of the document sensor 32 is ON or OFF (step S409).

If the output signal of the document sensor 32 is ON, the control unit 40 proceeds to step S410 and waits for a time required for the document 41 to travel the distance c1 (mm) from the point of time at which the document sensor 32 becomes ON. Upon lapse of the time required for the document 41 to travel the distance c1 (mm), the control unit 40 sends a control signal to the clutch 20 so as to turn the clutch 20 ON (step S411; timing T7 in FIG. 22). Therefore, the feeding mechanism 37 starts rotating, and feeds the subsequent document 42 from the document setting position 33.

Figure 24C:
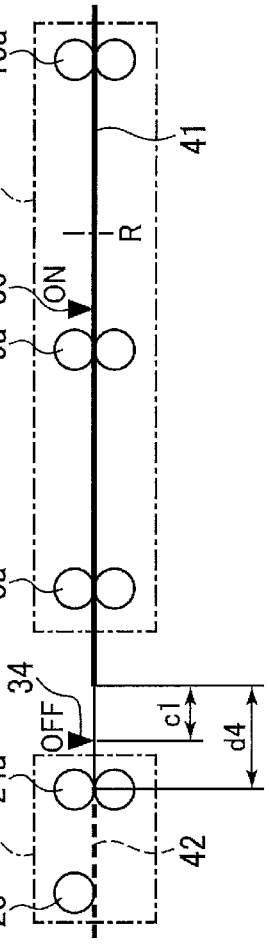
Figure 24D:
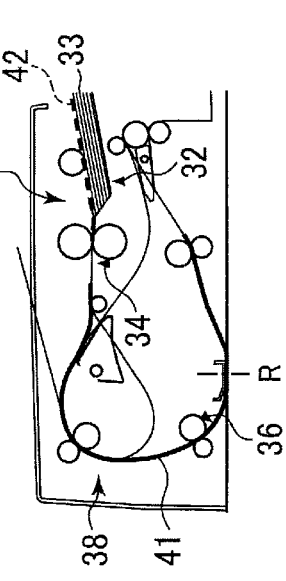

FIGS. 24C and 24D show conveying states and conveying positions of the documents 41 and 42 in the ADF 1 at this stage. A distance (i.e., a sheet-to-sheet distance) between the trailing edge of the preceding document 41 and the leading edge of the subsequent document 42 is a constant value d4 (mm).

Then, the preceding document 41 is read by the reading sensor 29, while the document 41 is conveyed by the conveying mechanism 38. Further, the subsequent document 42 is fed by the feeding mechanism 37, and is conveyed by the conveying mechanism 38.

When the trailing edge of the preceding document 41 passes the conveying sensor 36, the output signal of the conveying sensor 36 becomes OFF (step S422; timing T8 in FIG. 22). Then, the control unit 40 waits for a time required for the document 41 to travel the distance e1 (mm) from the point of time at which the output signal of the conveying sensor 36 becomes OFF (step S423). Upon lapse of the time required for the document 41 to travel the distance e1, the control unit 40 sends a control signal to the reading sensor 29 to end reading (step S414; timing T9 in FIG. 22). In this way, the reading operation of the document 41 is completed.

Figure 24E:
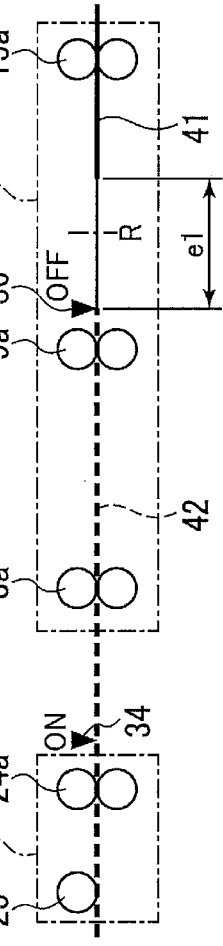
Figure 24F:
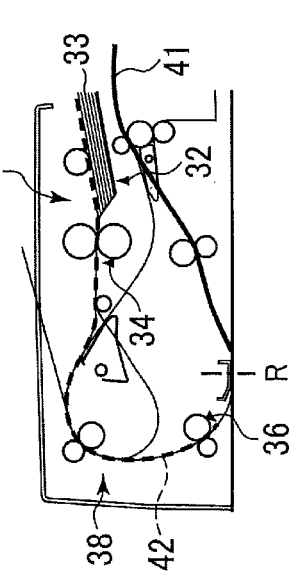

FIGS. 24E and 24F show conveying states and conveying positions of the documents 41 and 42 in the ADF 1 at this stage. When the trailing edge of the preceding document 41 passes the reading position R, the reading sensor 29 ends reading. The document 41 is further conveyed by the conveying mechanism 38, and is ejected from the ADF 1.

When the leading edge of the subsequent document 42 passes the conveying sensor 36, the output signal of the conveying sensor 36 becomes ON (step S403; timing T10 in FIG. 22). Then, the control unit 40 waits for a time required for the document 42 to travel the distance a1 (mm) from the point of time at which the output signal of the conveying sensor 36 becomes ON (step S404). Upon lapse of the time required for the document 42 to travel the distance a1, the control unit 40 sends a control signal to the clutch 20 so as to turn the clutch 20 OFF (step S405; timing T11 in FIG. 22). In this way, the transmission of rotation to the feeding mechanism 37 is cut off.

The above described steps S403 through S414 are repeated until no document is left in the document setting position 33 (until the output signal of the document sensor 32 becomes OFF).

When the output signal of the document sensor 32 becomes OFF (step S409; timing T12 in FIG. 22), the control unit 40 proceeds to step S415 and waits until the output signal of the conveying sensor 36 becomes OFF. That is, the control unit 40 waits until the trailing edge of the last document passes the conveying sensor 36.

Then, when the output signal of the conveying sensor 36 is OFF (timing T13 in FIG. 22), the control unit 40 proceeds to step S416 and waits for a time required for the document to travel the distance e1. Upon lapse of the time required for the document to travel the distance e1, the control unit 40 sends a control signal to the reading sensor 29 to end reading (step S417; timing T14 in FIG. 22). In this way, the reading operation of the last document is completed.

Then, upon lapse of a time required for the trailing edge of the last document to be ejected from the ADT 1 (step S418), the control unit 40 stops the motor 13 (step S419; timing T15 in FIG. 22). That is, the conveying mechanism 38 stops rotating.

As described above, in the case where the length of the document is longer than the distance between the feeding sensor 34 and the conveying sensor 36 (for example, in the case where the document size is B5 or larger), the conveyance control of the document (steps S401 through S407, S409 through S414) can be performed in a similar manner as described in the first embodiment. The conveyance control (including feeding, conveying and reading the document) of this case is also referred to as a first conveyance control.

In contrast, in the case where the length of the document is shorter than the distance between the feeding sensor 34 and the conveying sensor 36 (for example, in the case where the document size is A5 or smaller), the subsequent document 42 reaches the feeding sensor 34 before the preceding document 41 reaches the conveying sensor 36 (i.e., before the feeding of the document 41 by the feeding mechanism 37 ends). Therefore, the output signal of the feeding sensor 34 is turned ON by the subsequent document 42. That is, the conveyance control of the document (step S409 through S414) cannot be performed based on a timing at which the output signal of the feeding sensor 34 becomes OFF (step S408).

Therefore, in this embodiment, in the case where the document size is A5 or smaller, the conveying control (including feeding, conveying and reading the document) is performed based on a timing at which the output signal of the conveying sensor 36 becomes OFF as described below. The conveyance control of this case is also referred to as a second conveyance control.

FIGS. 25A through 25H are timing charts in the case where the document size is A5 or smaller. FIGS. 26A through 26F and FIGS. 27A through 27F are schematic views showing conveying states and conveying positions of the document whose size is A5 or smaller.

The conveyance control of the document whose size is A5 or smaller will be described with reference to the flowchart of FIG. 21, the timing, charts of FIGS. 25A through 25H and schematic views of FIGS. 26A through 26F and FIGS. 27A through 27F.

The control unit 40 receives the scan starting signal from the operation unit 45, and starts the scanning operation. First, the control unit 40 sends a control signal to the clutch 20 to turn the clutch 20 ON (step S401). As the clutch 20 is turned ON, the rotation of the motor 13 is transmittable to the feeding mechanism 37 (timing T1 in FIG. 25).

Then, the control unit 40 sends a control signal to the motor 13, and causes the motor 13 to start rotating (step S402). As the motor 13 starts rotating, the feeding mechanism 37 and the conveying mechanism 38 start rotating (timing T2 in FIG. 25).

FIGS. 26A and 26B show conveying states and conveying positions of the documents 41 and 42 in the ADF 1 at this stage. The feeding mechanism 37 feeds the uppermost document 41 from the documents set in the document setting position 33. When the leading edge of the document 41 reaches the feeding sensor 34, the output signal of the feeding sensor 34 becomes ON.

Further, the conveying mechanism 38 convey the document 41 (fed by the feeding mechanism 37) toward the reading position R. When the leading edge of the document 41 reaches the conveying sensor 36, the output signal of the conveying sensor 36 becomes ON (timing T3 in FIG. 25).

FIGS. 26C and 26D show conveying states and conveying positions of the documents 41 and 42 in the ADF 1 at this stage. In the case where the document size is A5 or smaller, when the leading edge of the preceding document 41 reaches the conveying sensor 36, the trailing edge of the document 41 has passed the pickup roller 23. Therefore, the pickup roller 23 contacts the surface of the subsequent document 42. That is, the subsequent document 42 is fed by the rotation of the pickup roller 23.

When the output signal of the conveying sensor 36 becomes ON (step S403), the control unit 40 proceeds to step S404 and waits for a time required for the document 41 to travel the distance a1 (mm). Upon lapse of the time required for the document 41 to travel the distance a1, the control unit 40 turns the clutch 20 OFF (step S405; timing T4 in FIG. 25). When the clutch 20 is turned OFF, the leading edge of the subsequent document 42 already reaches the feeding sensor 34, and therefore the output signal of the feeding sensor 34 remains ON (as in the case where the document size is B5 or larger).

Since the clutch 20 is turned OFF, the transmission of rotation to the feeding mechanism 37 is cut off. That is, the preceding document 41 is conveyed by the conveying mechanism 38.

Then, the control unit 40 waits for a time required for the document 41 to travel the distance b1 (mm) from the point of time at which the output signal of the conveying sensor 36 becomes ON (step S406). Upon lapse of the time required for the document 41 to travel the distance b1 (mm), the control unit 40 sends a control signal to the reading sensor 29 to start reading the document 41 (step S407; timing T5 in FIG. 25).

FIGS. 26E and 26F show conveying states and conveying positions of the documents 41 and 42 in the ADF 1 at this stage. The distance b1 corresponds to the distance from the conveying sensor 36 to the reading position R. That is, the reading sensor 29 starts reading the document 41 when the leading edge of the document 41 reaches the reading position R.

Then, the reading sensor 29 reads line images of the document, while the conveying mechanism 38 conveys the document 41. When the document 41 is further conveyed, and the trailing edge of the document 41 passes the conveying sensor 36, the output signal of the conveying sensor 36 becomes OFF (timing T8' in FIG. 25).

Figure 27B:
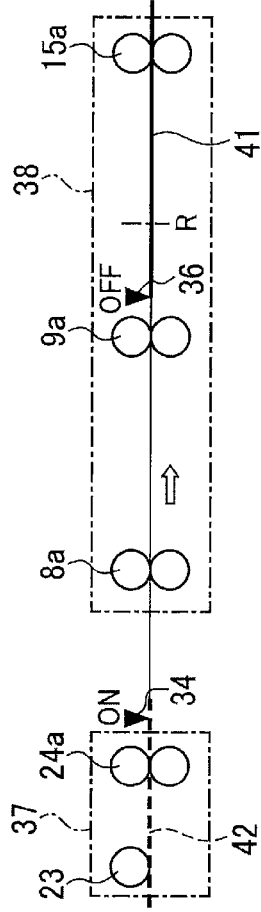
FIGS. 27A through 27F are schematic views showing conveying states and conveying positions of the document according to the third embodiment in the case where the document size is A5 or smaller.
Figure 27A:
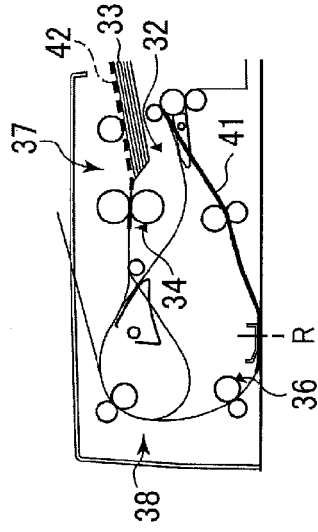

FIGS. 27A and 27B show conveying states and conveying positions of the documents 41 and 42 in the ADF 1 at this stage. When the output signal of the feeding sensor 34 becomes OFF, the leading edge of the subsequent document 42 has reached the feeding sensor 34, and therefore the output signal of the feeding sensor 34 is ON.

Then, the control unit 40 checks whether a current state is a state where "the output signal of the feeding sensor 34 is OFF and the output signal of the conveying sensor 36 is ON" (step S408). In the case where the document size is A5 or smaller, the state where "the output signal of the feeding sensor 34 is OFF and the output signal of the conveying sensor 36 is ON" is not reached as shown in FIGS. 27A and 27B. Therefore, the control unit 40 performs processing (step S420 through S424) for the document whose size is A5 or smaller as described below.

First, the control unit 40 checks whether the output signal of the conveying sensor 36 is OFF (step S420). When the output signal of the conveying sensor 36 becomes OFF, the control unit 40 proceeds to step S421 and waits for a time required for the document 41 to travel the distance e1 (mm). Upon lapse of the time required for the document 41 to travel the distance e1, the control unit 40 sends a control signal to the reading sensor 29 to end reading (step S422; timing T9' in FIG. 25). That is, the reading of the preceding document 41 is completed.

Figure 27D:
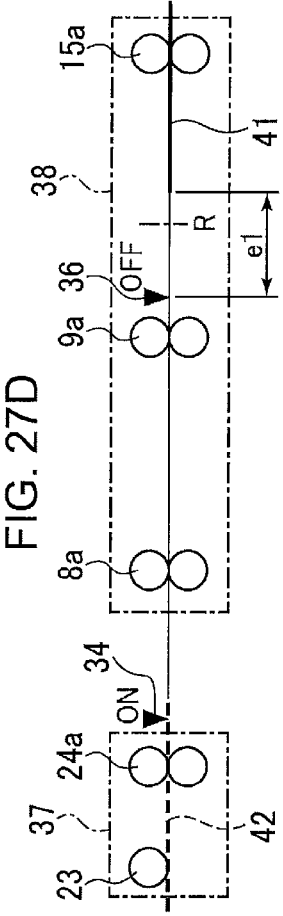
Figure 27C:
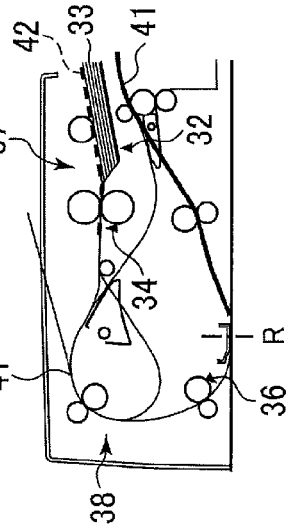

FIGS. 27C and 27D show conveying states and conveying positions of the documents 41 and 42 in the ADF 1 at this stage. The reading sensor 29 ends reading when the trailing edge of the preceding document 41 passes the reading position R. The preceding document 41 is ejected by the first ejection roller 15a and the second ejection roller 22a toward the ejection opening 22c.

Then, the control unit 40 waits for a time required for the document 41 to travel a distance f1 from the point of time at which the output signal of the conveying sensor 36 becomes OFF (step S423). Upon lapse of the time required for the document 41 to travel the distance f1, the control unit 40 sends a control unit to the clutch 20 to turn the clutch 20 ON (step S424; timing T9-2 in FIG. 25).

Figure 27F:
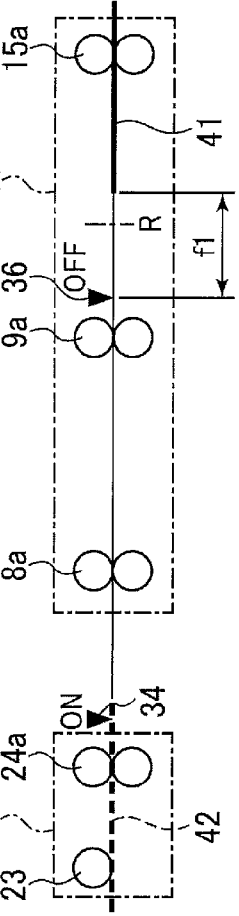
Figure 27E:
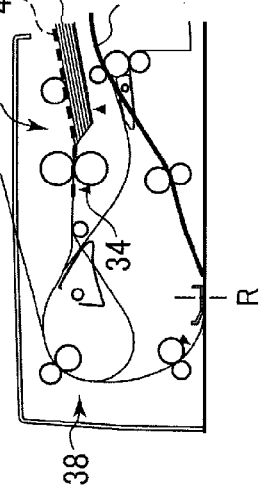

FIGS. 27E and 27F show conveying states and conveying positions of the documents 41 and 42 in the ADF 1 at this stage. Since the clutch 20 is turned ON, the pickup roller 23 and the feeding roller 24a (i.e., the feeding mechanism 37) start rotating, and start feeding the subsequent document 42. In this regard, the distance f1 (mm) is set to be larger than the distance e1 (mm) so as to prevent the clutch 20 to be turned ON during the reading of the preceding document 41.

Then, the above described steps S403 through S408 and S420 through S424 are repeated.

In the case where the document size is A5 or smaller, when there is no subsequent document in the document setting position 33, the feeding sensor 34 becomes OFF while the conveying sensor 36 remains ON in step S409. Therefore, processing of the steps S409, S415 through S419 described regarding the case where the document size is B5 or larger is performed. That is, the last document is ejected, and the motor 13 is stopped.

As described above, in either case where the document size is B5 or larger, or where the document size is A5 or smaller, the clutch 20 is turned OFF after the reading of the document is completed. Therefore, occurrence of distortion in the read image can be prevented.

As described above, according to the third embodiment of the present invention, even in the case where the length of the document is shorter than the distance between the feeding sensor 34 and the conveying sensor 36, the clutch 20 is turned OFF after the reading of the document is completed.

In particular, in the third embodiment, the document size is determined (step S408). Then, if the document size is not suitable for the first conveyance control based on the timing at which the output signal of the feeding sensor 34 becomes OFF, the second conveyance control is performed based on the timing at which the output signal of the conveying sensor 36 becomes OFF. Therefore, it becomes possible to turn OFF the clutch 20 after the reading of the document is completed, irrespective of the document size.

In this example, the conveyance control is switched based on whether the document size is a larger size (i.e., B5 or larger) or a smaller size (i.e., A5 or smaller). However, it is also possible to switch the conveyance control based on any other way.

Printer Unit

Figure 28:
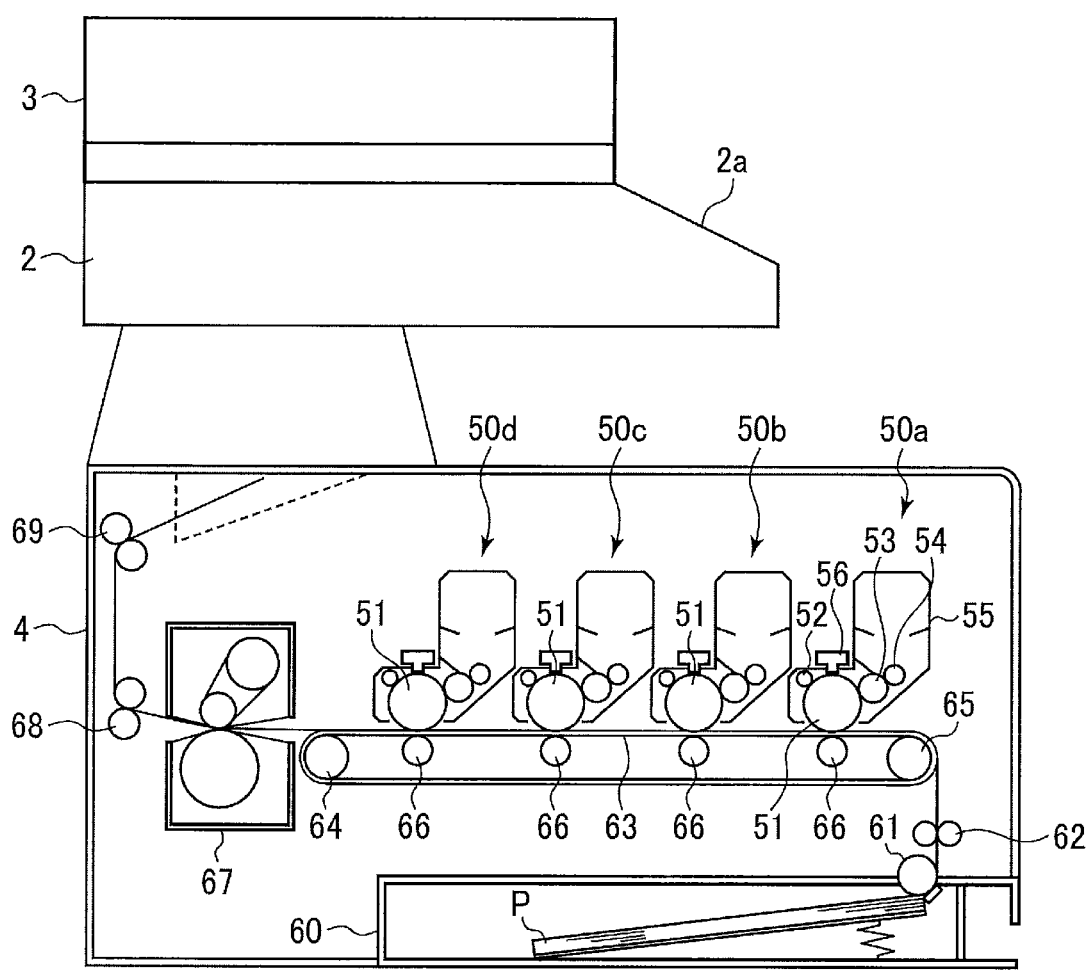
FIG. 28 is a schematic view showing a configuration of a printer unit of the MFP.

Finally, an example of the printer unit 4 that constitutes the MFP 100 together with the scanner unit 3 will be described. FIG. 28 shows an internal configuration of the printer unit 4.

The printer unit 4 is configured to form an image on a recording sheet (i.e., a medium) P using electrophotography. In a particular example, the printer unit 4 includes process units 50a, 50b, 50c and 50d of yellow (Y), magenta (M), cyan (C) and black (K). The process units 50a, 50b, 50c and 50d have the same configurations except for toners (developers), and therefore are collectively referred to as the process units 50.

The process unit 50 includes a photosensitive drum 51 as an image bearing body, a charging roller 52 as a charging member, a developing roller 53 as a developer bearing body, a supplying roller 54 as a supplying member, and a developer cartridge 55 as a developer storage body. Further, an exposure unit 56 is mounted so as to face an upper part of the photosensitive drum 51.

The charging roller 52 uniformly charges a surface of the photosensitive drum 51. The exposure unit 56 includes, for example, an LED (Light Emitting Diode) head. The exposure unit 56 emits light to expose the surface of the photosensitive drum 51 to form a latent image. The developing roller 53 develops a latent image on the surface of the photosensitive drum 51 with toner (developer). The supplying roller 54 supplies the toner to the developing roller 53. The developer cartridge 55 replenishes the toner to the supplying roller 54.

The printer unit 4 further includes a medium tray 60 that stores the recording sheets P, a pickup roller 61 that individually feeds the recording sheets P from the medium tray 60, and a conveying roller 62 that conveys the recording sheet P to the process units 50a, 50b, 50c and 50d.

The printer unit 4 further includes a transfer belt 63 provided so as to face the process units 50a, 50b, 50c and 50d. The transfer belt 63 is wound on a driving roller 64 and a driven roller 65. The driving roller 64 is rotated by a not shown driving source, and drives the transfer belt 63 through the process units 50a, 50b, 50c and 50d. Transfer rollers 66 are provided so as to face the respective photosensitive drums 51 of the process units 50a, 50b, 50c and 50d via the transfer belt 63.

A fixing unit 67 is provided downstream of the process units 50a, 50b, 50c and 50d in a conveying direction of the recording sheet P. The fixing unit 67 includes a heating roller, a pressure roller and the like, and fixes the toner to the recording sheet P by application of heat and pressure. Ejection roller pairs 68 and 69 are provided downstream of the fixing unit 67. The ejection roller pairs 68 and 69 eject the recording sheet P to an outside of the printer unit 4.

Image data of a document read by the scanner unit 3 is transmitted to the printer unit 4. The printer unit 4 receives the image data, and performs a printing operation based on the received image data. That is, the pickup roller 61 rotates to feed the recording sheet P from the medium tray 60. The conveying roller 62 conveys the recording sheet P to the transfer belt 63. The transfer belt 63 absorbs and holds the recording sheet P, and conveys the recording sheet P through the process unit 50a, 50b, 50c and 50d.

In each process unit 50, the charging roller 52 uniformly charges the surface of the photosensitive drum 51. The exposure unit 56 exposes the surface of the photosensitive drum 51 based on the image data to form a latent image. The developing roller 53 develops the latent image on the surface of the photosensitive drum 51 to form a toner image (i.e., a developer image). The toner image is transferred from the surface of the photosensitive drum 51 to the recording sheet P by the transfer roller 66.

The recording sheet P to which the toner images of the respective colors are transferred is conveyed to the fixing unit 67. The fixing unit 67 fixes the toner image to the recording sheet P. The recording sheet P with the fixed toner image is ejected by the ejection roller pairs 68 and 69 to the outside of the printer unit 4.

In this example, the scanner unit 3 and the printer unit 4 constitute the MFP 100. However, it is also possible to use the scanner unit 3 alone. Further, the printer unit 4 shown in FIG. 28 is merely an example. It is also possible to use other printer unit.

While the preferred embodiments of the present invention have been illustrated in detail, it should be apparent that modifications and improvements may be made to the invention without departing from the spirit and scope of the invention as described in the following claims.

What is claimed is:

1. An image reading apparatus comprising:
a feeding mechanism that individually feeds documents;
a conveying mechanism that conveys the document fed by the feeding mechanism so that the document passes a reading position;
a reading unit that reads the document at the reading position;
a control unit that controls the feeding mechanism and the conveying mechanism;
a motor; and
a clutch that transmits power from the motor to the feeding mechanism, wherein
when the control unit causes the feeding mechanism and the conveying mechanism to feed and convey a plurality of documents at constant intervals, the control unit causes the feeding mechanism to stop feeding after a trailing edge of a preceding document passes the reading position, and
the control unit turns the clutch OFF after the preceding document passes the reading position.

2. The image reading apparatus according to claim 1, further comprising a feeding detection unit that detects passage of the document fed by the feeding mechanism;
wherein the control unit causes the feeding mechanism to stop feeding upon lapse of a predetermine time after the feeding detection unit detects passage of a leading edge of a subsequent document.

3. The image reading apparatus according to claim 1, further comprising a conveyance detection unit that detects passage of the document conveyed by the conveying mechanism;
wherein the control unit causes the feeding mechanism to stop feeding upon lapse of a predetermine time after the conveyance detection unit detects passage of the trailing edge of the preceding document.

4. The image reading apparatus according to claim 1, further comprising:
a first conveyance detection unit that detects passage of the document conveyed by the conveying mechanism; and
a second conveyance detection unit that detects passage of the document at a position downstream of the first conveyance detection unit in a conveying direction of the document by the conveying mechanism;
wherein the control unit causes the feeding mechanism to stop feeding after the second conveyance detection unit detects passage of the trailing edge of the preceding document and before the first conveyance detection unit detects passage of a subsequent document.

5. The image reading apparatus according to claim 1, further comprising:
a feeding detection unit that detects passage of the document fed by the feeding mechanism; and
a conveyance detection unit that detects passage of the document conveyed by the conveyance detection unit,
wherein a distance between the feeding detection unit and the conveyance detection unit is longer than a length of the document.

6. The image reading apparatus according to claim 5, wherein the control unit selects one of a first conveyance control and a second conveyance control according to a size of the document,
wherein the first conveyance control is based on a timing at which the feeding detection unit detects the trailing edge of the preceding document, and
wherein the second conveyance control is based on a timing at which the conveyance detection unit detects the trailing edge of the preceding document.

7. The image reading apparatus according to claim 6, wherein the control unit determines the size of the document based on whether the conveyance detection unit has detected passage of a leading edge of a subsequent document when the feeding detection unit detects the passage of the trailing edge of the preceding document.

8. The image reading apparatus according to claim 1, further comprising:
a feeding detection unit that detects passage of the document fed by the feeding mechanism; and
a conveyance detection unit that detects passage of the document conveyed by the conveyance detection unit,
wherein the control unit causes the feeding mechanism to start and stop feeding, and causes the reading unit to start and stop reading, based on detection results of the feeding detection unit and the conveyance detection unit.

9. The image reading apparatus according to claim 8, wherein the control unit causes the feeding mechanism to start feeding a subsequent document upon lapse of a predetermined time after the feeding detection unit detects passage of the trailing edge of the preceding document.

10. The image reading apparatus according to claim 8, wherein the control unit causes the reading unit to start reading upon lapse of a predetermined time after the conveyance detection unit detects passage of a leading edge of the preceding document.

11. The image reading apparatus according to claim 8, wherein the control unit causes the reading unit to stop reading upon lapse of a predetermined time after the conveyance detection unit detects passage of the trailing edge of the preceding document.

12. The image reading apparatus according to claim 8, further comprising a document detection unit that detects presence or absence of the document in a document setting position in which the document to be fed is set, wherein when the document detection unit detects absence of the document in the document setting position, the control unit causes the reading unit to stop reading upon lapse of a predetermined time after the conveyance detection unit detects a trailing edge of a last document, and causes the conveying mechanism to stop conveying upon lapse of another predetermined time after the reading unit stops reading.

13. A composite apparatus comprising:
  the image reading apparatus according to claim 1; and
  an image forming apparatus that forms an image on a medium.

14. The image reading apparatus according to claim 1, wherein when the clutch is turned ON, the power is transmitted from the motor to the feeding mechanism.

15. The image reading apparatus according to claim 1, wherein when the clutch is turned OFF, transmission of the power from the motor to the feeding mechanism is cut off.

16. An image reading apparatus comprising:
  a feeding mechanism that individually feeds documents;
  a conveying mechanism that conveys the document fed by the feeding mechanism so that the document passes a reading position;
  a reading unit that reads the document at the reading position;
  a control unit that controls the feeding mechanism and the conveying mechanism;
  a first conveyance detection unit that detects passage of the document conveyed by the conveying mechanism; and
  a second conveyance detection unit that detects passage of the document at a position downstream of the first conveyance detection unit in a conveying direction of the document by the conveying mechanism, wherein
  when the control unit causes the feeding mechanism and the conveying mechanism to feed and convey a plurality of documents at constant intervals, the control unit causes the feeding mechanism to stop feeding after a trailing edge of a preceding document passes the reading position, and
  the control unit causes the feeding mechanism to stop feeding after the second conveyance detection unit detects passage of the trailing edge of the preceding document and before the first conveyance detection unit detects passage of a subsequent document.

17. A document conveying apparatus comprising:
  a feeding mechanism that individually feeds documents;
  a conveying mechanism that conveys the document fed by the feeding mechanism so that the document passes a reading position;
  a reading unit that reads the document at the reading position;
  a control unit that controls the feeding mechanism and the conveying mechanism;
  a feeding detection unit that detects passage of the document fed by the feeding mechanism; and
  a conveyance detection unit that detects passage of the document conveyed by the conveyance detection unit, wherein
  when the control unit causes the feeding mechanism and the conveying mechanism to feed and convey a plurality of documents at constant intervals, the control unit causes the feeding mechanism to stop feeding after a trailing edge of a preceding document passes the reading position, and
  the control unit determines the size of the document based on whether the conveyance detection unit has detected passage of a leading edge of a subsequent document when the feeding detection unit detects the passage of the trailing edge of the preceding document.

* * * * *